United States Patent
Hale et al.

(10) Patent No.: US 11,673,171 B2
(45) Date of Patent: Jun. 13, 2023

(54) LANDFILL GAS EXTRACTION CONTROL SYSTEM THROTTLE

(71) Applicant: Loci Controls, Inc., Wareham, MA (US)

(72) Inventors: Mike Hale, Hopewell Junction, NY (US); Keith Hale, Hopewell Junction, NY (US); Melinda Sims, Seattle, WA (US)

(73) Assignee: Loci Controls, Inc., Wareham, MA (US)

(*) Notice: Subject to any disclaimer, the term of this patent is extended or adjusted under 35 U.S.C. 154(b) by 0 days.

(21) Appl. No.: 17/083,970

(22) Filed: Oct. 29, 2020

(65) Prior Publication Data

US 2021/0062625 A1 Mar. 4, 2021

Related U.S. Application Data

(63) Continuation of application No. 16/510,167, filed on Jul. 12, 2019, now Pat. No. 10,851,627.

(60) Provisional application No. 62/697,839, filed on Jul. 13, 2018.

(51) Int. Cl.
*B09B 1/00* (2006.01)
*E21B 43/12* (2006.01)

(52) U.S. Cl.
CPC ............. *B09B 1/006* (2013.01); *E21B 43/12* (2013.01); *Y02E 50/30* (2013.01); *Y02W 30/30* (2015.05)

(58) Field of Classification Search
CPC ..................................................... B09B 1/006
See application file for complete search history.

(56) References Cited

U.S. PATENT DOCUMENTS

| | | |
|---|---|---|
| 6,999,883 B1 * | 2/2006 | Brady .................... B09B 1/006 702/50 |
| 10,851,627 B2 | 12/2020 | Hale et al. |
| 2004/0135112 A1 | 7/2004 | Greeb et al. |
| 2005/0236042 A1 | 10/2005 | Hansen et al. |
| 2013/0180703 A1 | 7/2013 | Colby |

(Continued)

FOREIGN PATENT DOCUMENTS

| | | |
|---|---|---|
| DE | 1924920 A1 | 12/1969 |
| WO | WO 2016/171918 A1 | 10/2016 |

OTHER PUBLICATIONS

International Search Report and Written Opinion for International Application No. PCT/US2019/041578 dated Sep. 26, 2019.

*Primary Examiner* — Janine M Kreck
(74) *Attorney, Agent, or Firm* — Wolf, Greenfield & Sacks, P.C.

(57) ABSTRACT

A system for extracting landfill gas from a landfill is provided. According to some embodiments, a control system for landfill gas extraction is provided. The control system uses a throttle to control flow of landfill gas extracted from the landfill. The throttle is actuated in use to vary the flow of gas between a well and a gas collection system, in accordance with a control algorithm that adjusts flow as a parameter in controlling gas extraction. The throttle is configured to ensure that there is at least some flow of landfill gas from the landfill to a gas output throughout operation. The extraction system provides an efficient system for landfill gas extraction, while mitigating a risk of creating undesired or unpleasant conditions and/or of violating regulations during operation.

11 Claims, 17 Drawing Sheets

(56) References Cited

U.S. PATENT DOCUMENTS

| | | |
|---|---|---|
| 2014/0110099 A1 | 4/2014 | Colby |
| 2017/0216893 A1* | 8/2017 | Campanella ............ B09B 1/006 |
| 2017/0218730 A1 | 8/2017 | Campanella et al. |
| 2017/0218732 A1 | 8/2017 | Campanella et al. |
| 2020/0016640 A1 | 1/2020 | Hale et al. |

* cited by examiner

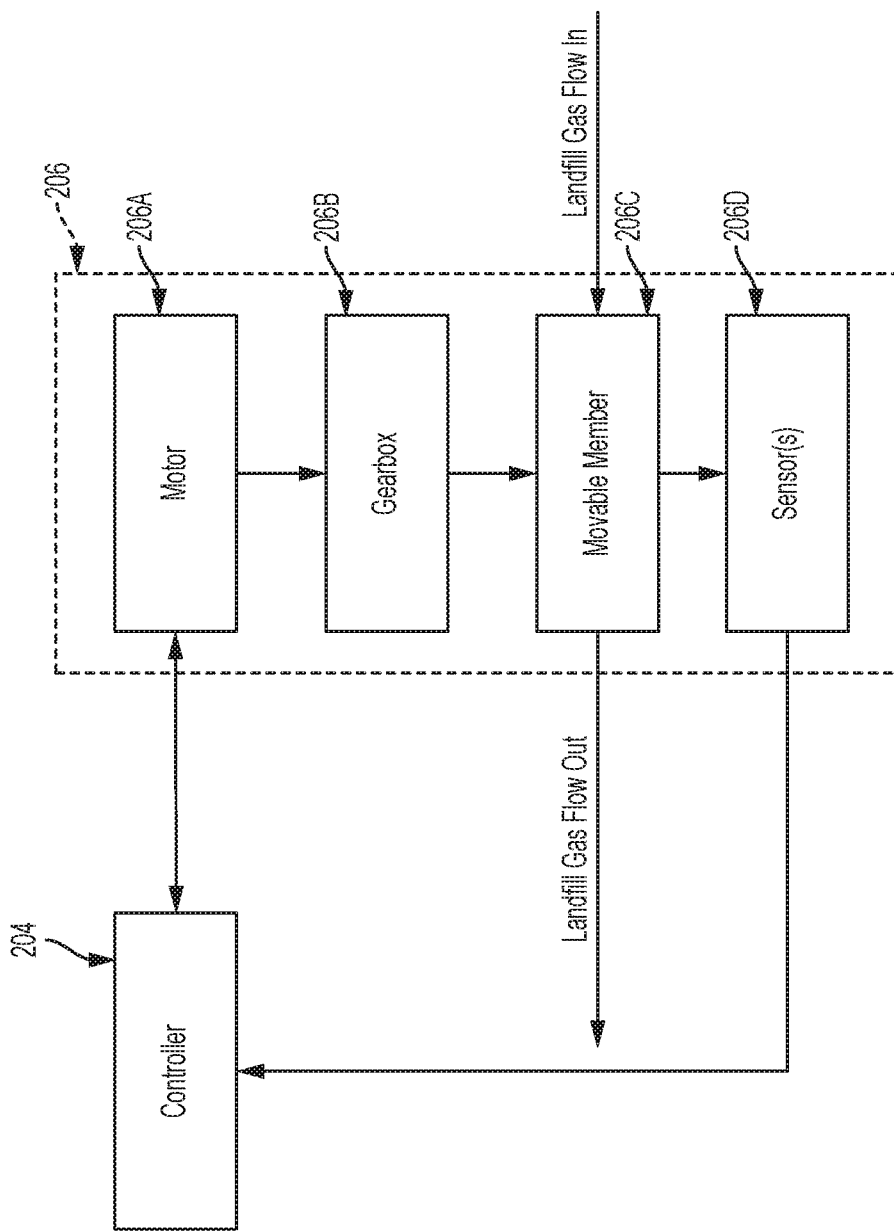

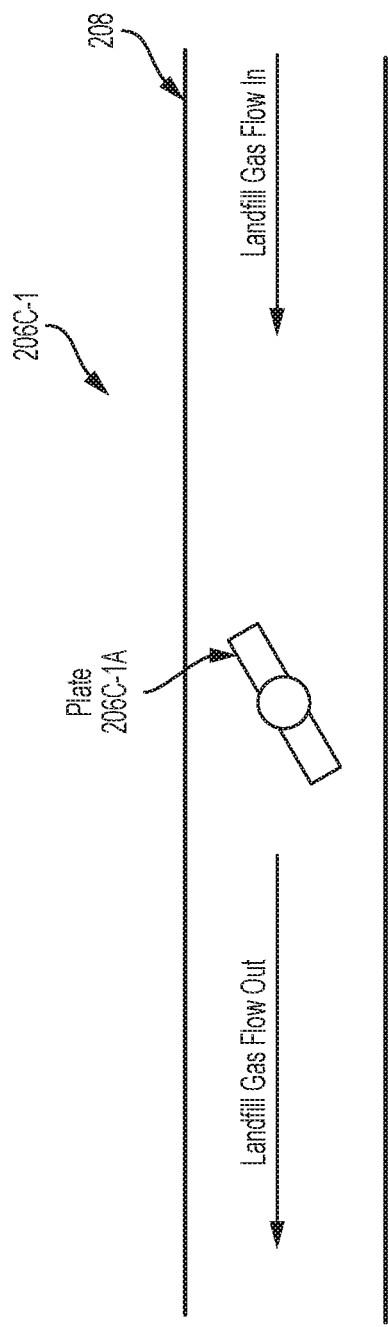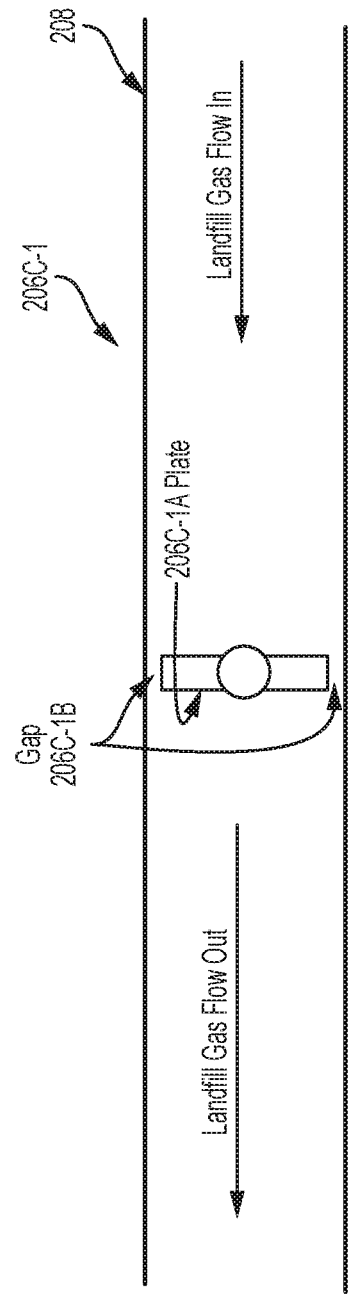

LANDFILL GAS EXTRACTION CONTROL SYSTEM THROTTLE

RELATED APPLICATIONS

This application is a continuation of and claims priority under 35 U.S.C. § 120 to U.S. patent application Ser. No. 16/510,167, titled "LANDFILL GAS EXTRACTION CONTROL SYSTEM THROTTLE" and filed on Jul. 12, 2019, which claims benefit under § 119(e) of U.S. Provisional Application Ser. No. 62/697,839 titled "LANDFILL GAS EXTRACTION CONTROL SYSTEM THROTTLE" and filed on Jul. 13, 2018, each of which is incorporated by reference herein in its entirety.

FEDERALLY SPONSORED RESEARCH

This invention was made with government support under SBIR Phase 1B Award No. 1520346, and SBIR Phase II Award No. 1632439 awarded by the National Science Foundation. The government has certain rights in the invention.

BACKGROUND

Landfills produce gas as a result of decomposition of organic waste in the landfill. The decomposition process may result in release of methane and other gases. Landfill sites are often capped with a layer of cover material to reduce the escape of gases from the landfill to the atmosphere. Landfills may further install gas extraction systems to pull landfill gas out before it can permeate through the cover layer and escape. The gas extraction systems may comprise multiple wells drilled into the landfill, and landfill gas may be extracted from the landfill via the wells into a gas collection system. The extracted landfill gas may be used to generate electricity, put in a pipeline for distribution, or disposed of.

SUMMARY

According to one aspect, a control system for controlling extraction of landfill gas from a landfill via a gas extraction system is provided. The gas extraction system comprises well piping for coupling at least one well to a gas output. The control system comprises: a throttle disposed in the well piping and configured to restrict a flow of landfill gas, wherein at least some landfill gas can flow through the well piping with the throttle at a position of maximum closure; and a controller configured to control a position of the throttle to control the flow of landfill gas.

According to one embodiment, the throttle is configured to block a variable portion of an aperture through which the landfill gas flows. According to one embodiment, the throttle comprises a plate configured to restrict the flow of landfill gas. According to one embodiment, controlling the position of the throttle comprises rotating the plate. According to one embodiment, controlling the position of the throttle comprises sliding the plate along a plane intersecting the flow of landfill gas. According to one embodiment, the plate comprises a perforation configured to allow at least some landfill gas flow through the throttle at the position of maximum closure. According to one embodiment, the throttle comprises a mechanism to limit a rotation range of the plate. According to one embodiment, the mechanism to limit the rotation range is configured to limit rotation between a first position of 0 degrees at a position of minimum closure and a second position of 90 degrees at the position of maximum closure.

According to one embodiment, the throttle comprises a ball valve, the ball valve comprising a first perforation and a second perforation, the second perforation configured to allow at least some flow through the ball valve at the position of maximum closure. According to one embodiment, the throttle is configured to allow at least 1% of a flow of landfill gas through the throttle at a position of minimum closure. According to one embodiment, the throttle is configured to maintain a difference in pressure between upstream and downstream of the throttle greater than 0 mbar. According to one embodiment, the flow of landfill gas through the throttle at the position of maximum closure is at least 0.1 cubic feet per minute.

According to one embodiment, the throttle comprises a motor configured to adjust a variable portion of an aperture through which the landfill gas flows. According to one embodiment, the motor is configured to use less than 10 watts to adjust the position of the throttle. According to one embodiment, the motor has a volume less than or equal to 10 inches cubed. According to one embodiment, the throttle comprises a gear box configured to prevent back-drive of the throttle. According to one embodiment, the throttle comprise: a battery source to power the motor; and a solar panel to charge the battery.

According to one embodiment, the throttle is configured to provide control of the flow rate on a continuous scale. According to one embodiment, the throttle has a weight less than 3 lbs. According to one embodiment, the control system further comprises a flow measurement device configured to obtain a measurement of flow rate of landfill gas through the throttle, wherein the controller is configured to control the position of the throttle based at least on the obtained measurement of flow rate. According to one embodiment, the flow measurement device comprises an orifice plate. According to one embodiment, wherein the flow measurement device comprises a venturi meter. According to one embodiment, the flow measurement device comprises a pitot tube. According to one embodiment, the flow measurement device comprises one of an optical flow meter or a thermal mass flow meter.

According to one embodiment, the control system further comprises: a pressure sensor configured to obtain a measurement of pressure upstream of the throttle; wherein the controller is configured to control the position of the throttle based at least on the obtained measurement of the pressure upstream of the throttle.

According to another aspect, a method of controlling extraction of landfill gas from a landfill via a gas extraction system is provided. The method comprises: obtaining, using a sensor, a measurement of a characteristic of landfill gas extracted from the landfill; controlling a flow of landfill gas extracted from the landfill based at least in part on the measurement of the characteristic, wherein the controlling comprises allowing at least some flow of landfill gas from the landfill to a gas output.

According to one embodiment, obtaining, using the sensor, the measurement of the characteristics of landfill gas comprises measuring a concentration of methane, oxygen, and/or carbon dioxide in the landfill gas. According to one embodiment, controlling the flow of landfill gas comprises controlling a position of a throttle configured to restrict a flow of landfill gas through the throttle. According to one embodiment, controlling the position of the throttle comprises controlling a rotational position of a plate. According to one embodiment, controlling the position of the throttle comprises controlling a linear position of a plate along a plane intersecting the flow of landfill gas.

According to one embodiment, the method further comprises controlling the position of the throttle with a motor using less than 10 watts of power. According to one embodiment, the method further comprises maintaining a difference in pressure between upstream and downstream of the throttle greater than 0 mbar. According to one embodiment, controlling the position of the throttle with the motor comprises: drawing electrical power when changing the position of the throttle; and holding the throttle in position with a gearbox.

According to another aspect, a control system for controlling extraction of landfill gas from a landfill via a gas extraction system is provided. The gas extraction system comprises well piping for coupling at least one well to a gas output. The control system comprises: a plate disposed in the well piping and configured to control a size of an area through which extracted landfill gas flows, wherein the plate, when in a position of maximum closure, is configured to allow at least some flow of landfill gas through the area; a controller configured to control a position of the plate to control the size of the area through which the extracted landfill gas flows.

According to one embodiment, wherein the controller is configured to control a rotational position of the plate. According to one embodiment, the control system further comprises comprising a mechanism to limit the rotational position of the plate between 0 and 90 degrees. According to one embodiment, the control system further comprises a motor configured to adjust the position of the plate, wherein the motor uses less than 10 watts of power to adjust the position of the plate. According to one embodiment, the control system further comprises a gearbox configured to prevent back-drive of the plate. According to one embodiment, the motor is magnetically coupled to the plate.

According to one embodiment, the control system further comprises: a pressure sensor configured to obtain a measurement of pressure upstream of the throttle; wherein the controller is configured to control the position of the plate based at least on the obtained measurement of the pressure upstream of the throttle. According to one embodiment, the plate has a diameter less than 8 inches.

BRIEF DESCRIPTION OF DRAWINGS

Various aspects and embodiments will be described with reference to the following figures. It should be appreciated that the figures are not necessarily drawn to scale.

FIG. 2B is a block diagram of an example throttle, in accordance with some embodiments of the technology described herein.

FIG. 2C is a schematic illustration of an illustrative embodiment of a movable member for restricting flow with the movable member in a state in which flow is enabled;

FIG. 2D is a schematic illustration of the movable member for restricting flow illustrated in FIG. 2D with the movable member at a position of maximum closure in which flow is restricted;

DETAILED DESCRIPTION

Figure 1A:
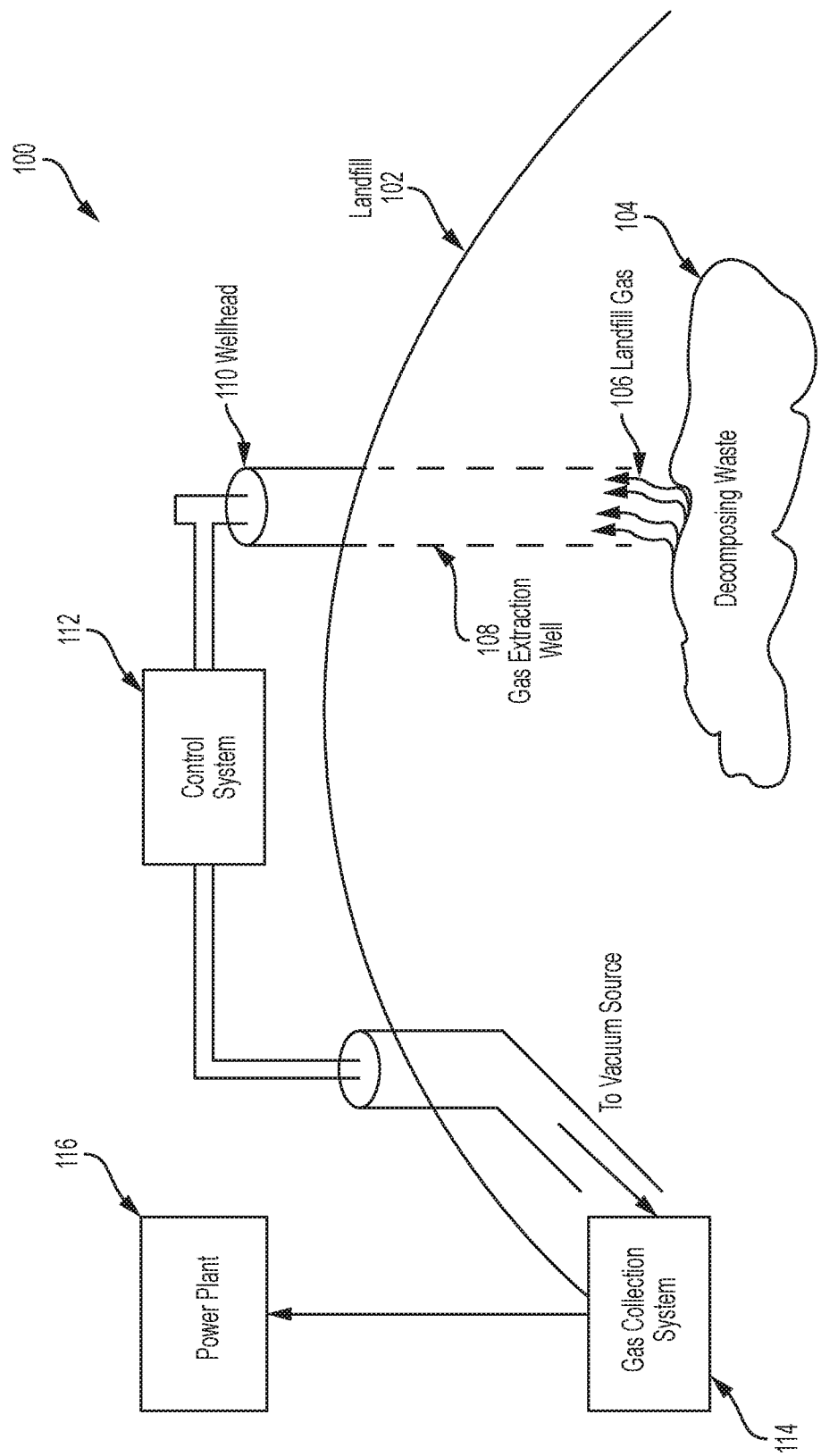
FIG. 1A shows an illustrative environment in which aspects of the technology described herein may be implemented.

The inventors have developed a gas extraction system that efficiently extracts landfill gas. The inventors have recognized and appreciated advantages to configuring the gas extraction system with a throttle for controlling the flow of landfill gas to maintain at least some flow of landfill gas from the landfill to a gas output. A throttle provides a flow control mechanism that allows at least some flow of landfill gas from the landfill to the gas output, even when the throttle is in a position of maximum closure. Such a system reduces the likelihood of an unintended release of landfill gas into the environment.

Moreover, such a system may be operated with low power, which may be supplied with small solar panels or other source without a connection to the power grid. The throttle may have a smaller size or be made from lighter components and thus require less power to operate than flow control mechanisms used in conventional gas extraction systems.

Gas extraction systems control extraction of gas from a landfill to meet one or more objectives. For example, the objective(s) may include maximizing an energy content of gas extracted from the landfill (e.g., by maximizing an amount or concentration of methane in the gas, and/or by setting a flow rate to maximize the energy content), ensuring that extracted complies with regulations (e.g., government regulations), lowering an environmental impact of extracted gas, obtaining a specific composition of specific gases (e.g., methane, oxygen, carbon dioxide) in the extracted gas, and/or meeting an energy demand (e.g., of a power plant). Some gas extraction systems control flow of landfill gas from the landfill to a gas output to meet the objective(s). For example, gas extraction systems may control a flow rate of landfill gas extracted from the landfill to meet the objective(s).

The inventors have recognized that conventional mechanisms for controlling the flow of landfill gas create problems in landfill gas extraction. One problem with conventional mechanisms is that they may completely shut off flow of landfill gas. When the flow is completely shut off, the gas output may have a positive pressure with respect to the landfill. In this scenario, landfill gas may escape into the environment, instead of being drawn by a vacuum to the intended gas output, where it can be collected. Escape of landfill gas is harmful to the environment and unpleasant for neighbors. Also, a positive pressure at the gas output (e.g., in a gas collection system) may violate regulations. In some cases, violation of such regulations may require complete shut off the landfill gas extraction system until the system can be shown to be operating in accordance with regulations. Such a shutdown and startup can be extremely undesirable for a landfill operator, accordingly, configuring the landfill gas extraction system with a throttle may avoid these undesired operating states.

Moreover, a throttle may be small and enable low power operation such that a controller may operate from solar power that directly powers the controller or that charges a battery that supplies power. For example, conventional systems may use flow control mechanisms that include large parts that require a large amount of energy for actuation. For example, some flow control devices may have a volume greater than 6 in$^3$, and weigh more than 4 lbs. A system using such a flow control device may require over 50 watts of power to actuate a valve to control flow of landfill gas. Conventional systems may also require power to maintain the set point of a flow control device. For example, given the size of the valve, the system may be unable to hold the valve at a set position, and may require generation of force and, in turn, use of energy by an actuator to hold the valve at the position, further increasing the energy demand of the system.

Further, a throttle may provide a more linear relationship between flow and a position of the throttle compared to conventional systems as the throttle may reduce the impact on flow for a given change in position, and provides a larger operational range for restricting flow. With respect to relative impact on flow, for example, conventional systems may use flow control mechanisms in which a 5% change in position results in a delta of 10 cubic feet per minute of flow. For a throttle, a 5% change in position of a throttle may result in a delta of 5 cubic feet per minute. With respect to operational range, for example, a conventional flow control mechanism may provide 60 degrees of rotation that can be used to restrict flow. A throttle may provide a range of 90 degrees of rotation that can be used to restrict flow.

In some embodiments, the control system for controlling extraction of landfill gas from a landfill via a gas extraction system may include a throttle for controlling the flow of landfill gas. The gas extraction system may have well piping that couples a well in a landfill to a gas output (e.g., a gas collection system). The throttle may be disposed in the well piping and restrict flow of landfill gas. The throttle may be configured to allow at least some landfill gas to flow through the piping at a position of maximum closure. In some embodiments, the throttle may be configured to block a variable portion of an aperture through which the landfill gas extracted from the landfill flows. The throttle may be configured to control the variable portion. For example, the throttle may be configured to control an area of the aperture that is blocked. In some embodiments, the throttle may have a position of maximum closure at which the throttle allows at least some flow of landfill gas. By ensuring that at least some landfill gas can flow through the aperture, the throttle prevents the gas output (e.g., a gas collection system) from going to a positive pressure, which may be a condition that would allow landfill gas to permeate and escape to the atmosphere and/or violate regulations. Accordingly, the throttle may be configured to ensure that the pressure between the gas output and the landfill greater than 0 mbar.

In some embodiments, to control extraction of landfill gas via a gas extraction system, the control system may obtain, using one or more sensors, measurements of one or more characteristics of landfill gas extracted from the landfill. The control system may control the flow of landfill gas extracted from the landfill based at least in part on the measurements of the characteristic(s). In some embodiments, the control system may control the flow by modulating the flow and ensuring that there is at least some flow of landfill gas. In some embodiments, the control system controls the flow of landfill gas by controlling a position of a throttle that ensures that there is at least some flow of landfill gas.

FIG. 1A illustrates an example environment 100 in which aspects of the technology described herein may be implemented. The illustrative environment 100 includes a landfill 102 which holds decomposing waste 104. The decomposing waste 104 produces landfill gas (LFG) 106 which is extracted through a gas extraction well 108. The gas extraction well includes a wellhead 110 through which a control system 112 is coupled to the gas extraction well 108. The control system 112 may be configured to control extraction of gas via the gas extraction well 108. An output of the gas extraction system may be coupled to a gas collection system 114, which collects the landfill gas 106 extracted through the gas extraction well 108. The gas collection system 114 supplies the extracted landfill gas to a power plant 116. Although in the example embodiment shown in FIG. 1A, a single wellhead 110 is shown, in some embodiments, the environment 100 may include multiple wellheads at multiple sites. In such embodiments, the landfill gas may be extracted from the multiple sites.

In some embodiments, the gas collection system 114 includes a vacuum source. The vacuum source generates a negative pressure differential between the gas collection system 114 and the landfill 102. The negative pressure differential causes the landfill gas 106 to flow from the landfill 102 to the gas collection system 114 through the gas extraction well 108. In some embodiments, the gas collection system 114 may comprise an additional location where extracted landfill gas is stored, and where the extracted landfill gas may be treated (e.g., by removing impurities) before being supplied to the power plant or to the pipeline infrastructure 116. The power plant 116 may be configured to convert the extracted landfill gas into electrical power. For example, the power plant 116 may be configured to burn the extracted landfill gas to turn a rotor of an electricity generator or a turbine.

It should be appreciated, that although FIG. 1A illustrates supplying of extracted landfill gas from the collection system 114 to a power plant 116, the extracted landfill gas may additionally or alternatively be supplied to one or more other locations, and/or used for other purposes. For example, the gas collection system 114 may be configured to supply gas to existing gas pipelines, boilers, greenhouses, heating units, and/or other locations, as aspects of the technology described herein are not limited with respect to where the extracted landfill gas is supplied.

In some embodiments, the control system 112 controls extraction of the landfill gas 106 through the gas extraction well 108. In some embodiments, the control system 112 may be configured to operate to control extraction of landfill gas to achieve a desired outcome or outcomes with respect to energy content of extracted landfill gas, composition of extracted landfill gas, flow rate of gas extraction, regulatory requirements, and/or other parameters. In some embodiments, the control system 112 may include multiple components that operate to achieve the outcome(s), as discussed in more detail herein.

Figure 1B:
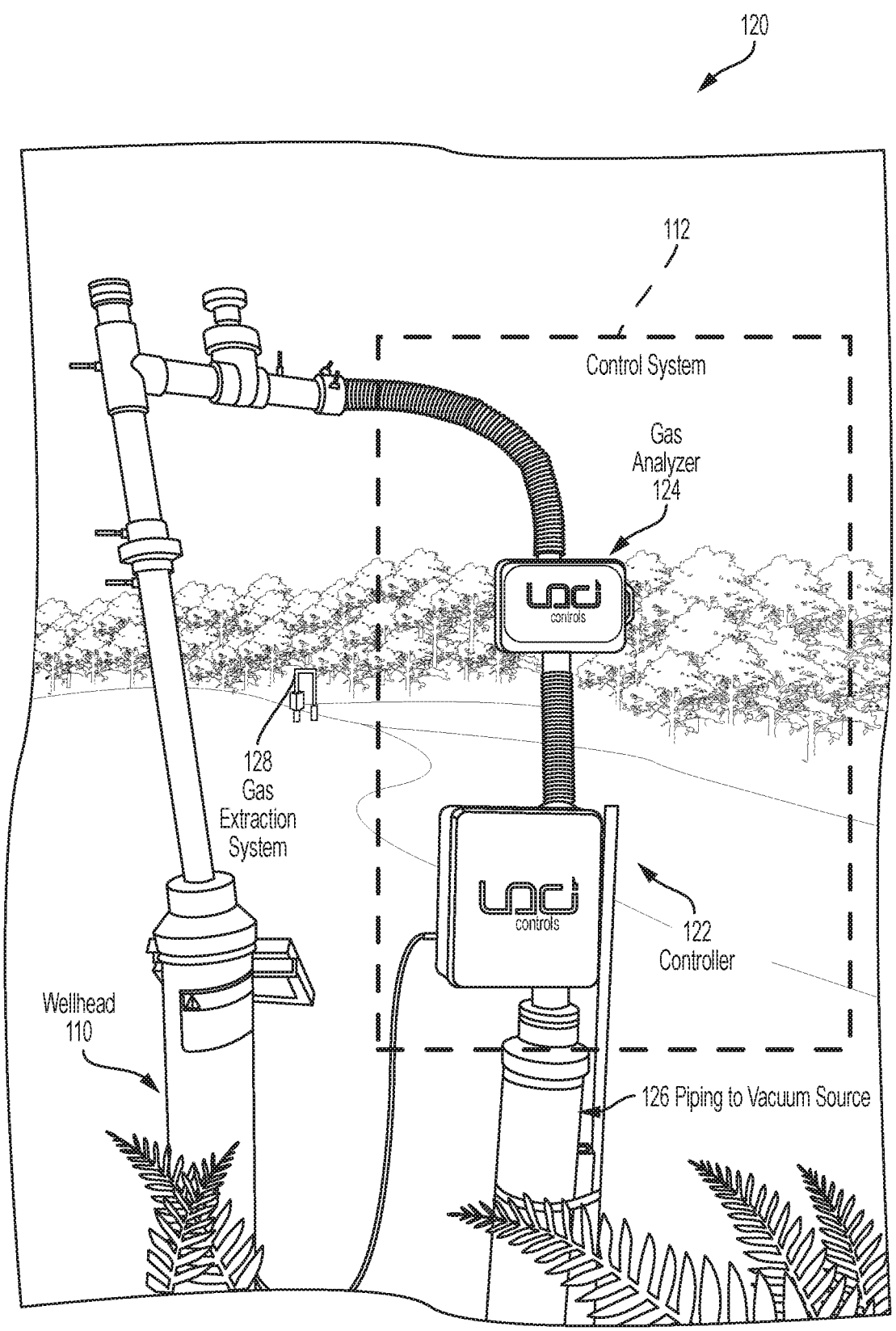
FIG. 1B shows an example control system for landfill gas extraction, in accordance with some embodiments of the technology described herein.

FIG. 1B illustrates an example implementation of the control system 112 for a landfill gas extraction system 120. The gas extraction well 108 may be coupled to the vacuum source through the piping 126 that leads to the vacuum source. Landfill gas may flow from the gas extraction well 108 towards the vacuum source via the piping 126. In some embodiments, the control system 112 is disposed within the piping 126 such that the control system 112 controls the flow of gas from the wellhead 110 to the vacuum source via the piping 126. The control system 112 includes a gas analyzer 124 which the control system 112 uses to determine one or more characteristics of the extracted landfill gas. The control system 112 includes a controller 122 that uses the determined characteristic(s) to control extraction of landfill gas. In some embodiments, the controller 122 may be configured to use the measured characteristic(s) to control a flow rate of landfill gas extraction. For example, the controller 122 may be configured to use the measured characteristic(s) to control a position of a throttle that controls the flow rate of landfill gas being extracted.

In some embodiments, the gas analyzer 124 may be configured to collect and analyze extracted landfill gas. The gas analyzer 124 may be configured to include one or more sensors to measure the characteristic(s) of the extracted landfill gas. In some embodiments, the gas analyzer 124 may be configured to use the sensor(s) to measure composition, temperature, and/or other characteristic of the extracted landfill gas. In some embodiments, the gas analyzer may be configured to use the sensor(s) to measure the characteristic(s) of landfill gas when the gas is extracted (e.g., before being analyzed by the gas analyzer 124). For example, the sensor(s) may be used to measure concentration of methane, carbon dioxide, oxygen, and/or hydrogen sulfide. The sensor(s) may comprise, for example, infrared sensors, catalytic beads, electrochemical sensors, photoionization detectors, zirconium oxide sensors, thermal conductive detectors, and/or any other suitable sensing technology for measuring the characteristic(s) of the landfill gas, as aspects of the technology described herein are not limited to using a particular type of sensor.

In some embodiments, the gas analyzer 124 may be configured to determine one or more characteristics of the environment (e.g., ambient temperature, atmospheric pressure, wind direction, wind speed, precipitation, humidity), and/or gas in the landfill (e.g., temperature, composition, humidity). The gas analyzer 124 may include one or more sensors to obtain measurements of the characteristic(s). The sensors can include, for example, temperature sensors, humidity sensors, pH sensors, pressure sensors and/or any other type of sensor(s) for sensing environmental characteristics.

In some embodiments, the controller 122 may be configured to control one or more parameters of landfill gas extraction. In some embodiments, the controller 122 may be configured to control a flow rate of landfill gas being extracted from the landfill 102. In some embodiments, the control system 112 may include a flow control mechanism to control a flow rate of landfill gas extraction. For example, the control system 112 may include a throttle that includes an actuation mechanism for changing the position of the throttle to control the flow rate. The controller 122 may be configured to determine and apply settings to the throttle to control the flow rate of landfill gas extraction (e.g., operate the actuation mechanism to change the position of the throttle to a determined position). In some embodiments, the control mechanism is placed between the gas extraction well 108 and the gas collection system 114 such that gas being extracted through the gas extraction well 108 flows through the control mechanism on its way to the gas collection system 114.

In some embodiments, the throttle maintains at least some flow of landfill gas from the landfill 102 to the gas collection system 114. In some embodiments, the throttle may be configured to block a variable portion of an aperture through which landfill gas extracted from the landfill flows. The position of the throttle may determine the variable portion of the aperture through which the landfill gas flows. In some embodiments, the throttle may have a position of maximum closure at which it allows at least some flow. In some embodiments, at the position of maximum closure the throttle may be configured to block a maximum portion of the aperture that is less than a full area of the aperture to allow at least some flow of landfill gas through the aperture when the throttle blocks the maximum portion. In some embodiments, the throttle may include a separate channel for at least some landfill gas to flow at the position of maximum closure.

In some embodiments, the maximum variable portion of the aperture that can be blocked is less than or equal to a percentage of the area of the aperture. In some embodiments, the maximum variable portion is less than 100% of the area of the aperture. In some embodiments, the maximum variable portion is less than 99%, 98%, 97%, 96%, or 95% of the area of the aperture. In some embodiments, the maximum portion of the aperture occluded when the throttle is in a position of maximum closure may be between 90% and 99% or between 85% to 99% or between 85% and 95%, in various embodiments. By limiting the variable portion to be less than the area of the aperture, the throttle may prevent the flow of landfill gas from completely shutting off, and thus prevent the gas output from going to a positive pressure relative to the landfill.

In some embodiments, the component that is moved to block the aperture may have an area that is greater than or equal to 100% of the area of the aperture. In these embodiments, the throttle may not shut off the flow of landfill even at a position of maximum closure. The throttle may not completely seal off flow, and thus will still allow at least some flow of landfill gas through the aperture, and thus prevent the gas output from going to a positive pressure.

In some embodiments, the throttle may be configured to allow at least a portion of the maximum flow rate. The maximum flow rate may comprise a flow rate of landfill gas through an aperture without any portion of the aperture being blocked. In some embodiments, the throttle may be configured to allow at least 1% of the maximum flow rate, regardless of operating state of the throttle. In some embodiments, the throttle may be configured to allow at least 2%, 3%, 4%, or 5% of the maximum flow rate. In some embodiments, the throttle may be configured to allow less than 20% of the maximum flow rate at a position of maximum closure. In some embodiments, the throttle may be configured to allow less than 10% of the maximum flow rate at the position of maximum closure. In some embodiments, the throttle may be configured to allow less than 5% of the maximum flow rate at the position of maximum closure.

In some embodiments, the throttle may be configured to allow at least a minimum flow rate of the landfill gas. In some embodiments, the throttle may be configured to allow at least 0.1 cubic feet per minute. In some embodiments, the throttle may be configured to allow at least 0.2, 0.3, 0.4, 0.5, 0.6, 0.7, 0.8, 0.9, or 1 cubic feet per minute of landfill gas flow. In some embodiments, the throttle may be configured to allow a minimum flow rate of any value between 1 and 5 cubic feet per minute. In some embodiments, the throttle may be configured to allow 0.1-120 cubic feet per minute, 0.1-150 cubic feet per minute, 0.1-175 cubic feet per minute, or 0.1-200 cubic feet per minute. Herein, cubic feet per minute are standard cubic feet per minute.

In some embodiments, the throttle may include a motor that generates a force by which to adjust the position of the throttle. The controller 122 may be configured to control the position of the throttle using the motor. In some embodiments, the controller 122 may be configured to control a flow rate of landfill gas extracted from the landfill by controlling the position of the throttle. For example, by changing the throttle position to increase the portion of the aperture that is blocked, the controller 122 may increase the flow rate of landfill gas; and by changing the plate position to decrease the portion of the aperture that is blocked by the plate, the controller 122 may decrease the flow rate of landfill gas.

In some embodiments, the controller 122 may be coupled to the gas analyzer 124. The controller 122 may be configured to use measurements obtained by the gas analyzer 124 to determine the control parameter(s). In some embodiments, the controller 122 may be configured to regulate the landfill gas flow rate based on the measurements obtained by the gas analyzer 124. To adjust the flow rate, in some embodiments, the controller 122 may be configured to adjust a throttle position to modify the flow rate. The controller 122 may be configured to control an actuation mechanism (e.g., a motor) to move the position of the throttle in order to obtain a position. In some embodiments, the controller 122 may be configured to determine a target flow rate based on the measurements of the characteristic(s) obtained by the gas analyzer 124. The controller 122 may be configured to adjust the throttle such that the flow rate is the target flow rate.

In some embodiments, the control system 112 may be configured to determine a measure of energy content of landfill gas being extracted from the landfill 102. The gas analyzer 124 may be configured to obtain a measurement of concentration of methane in extracted landfill gas. The controller 122 may be configured to determine a flow rate of the gas being extracted from the landfill. The control system 112 may be configured to determine an energy content of the landfill gas being extracted from the landfill 102 based on the concentration of methane and the flow rate. The controller may be configured to determine a target energy content of landfill gas being extracted from the landfill 102 and control a throttle to set the flow rate such that the energy content of the landfill gas being extracted reaches the target energy content.

Example systems and techniques for controlling extraction of landfill gas are described in U.S. Patent Application Publication No. 2017/0216893, entitled "DEVICES AND TECHNIQUES RELATING TO LANDFILL GAS EXTRACTION" filed on Mar. 13, 2017, incorporated herein by reference. Some embodiments may include one or more features of embodiments described in the referenced application.

In some embodiments, multiple wells or gas extraction systems may be located at a landfill to extract gas from the landfill. For example, FIG. 1B illustrates another well and gas extraction system 128 located at the landfill. In some embodiments, multiple gas extraction systems at the landfill may include the control system 112 for controlling extraction of landfill gas from the landfill. For example, gas extraction system may include the control system 112 to control extraction of landfill gas via the gas extraction system 128.

Although the gas analyzer 124 and the controller 122 are shown as separate components in FIG. 1A, in some embodiments, the gas analyzer 124 and controller 122 may be portions of a single unit. Some embodiments are not limited to any particular arrangement or combination of the gas analyzer 124 and the controller 122. In some embodiments, functionality described for each of the gas analyzer 124 and the controller 122 may be interchanged between the two components, as some embodiments of the technology described herein are not limited in this respect.

Figure 1C:
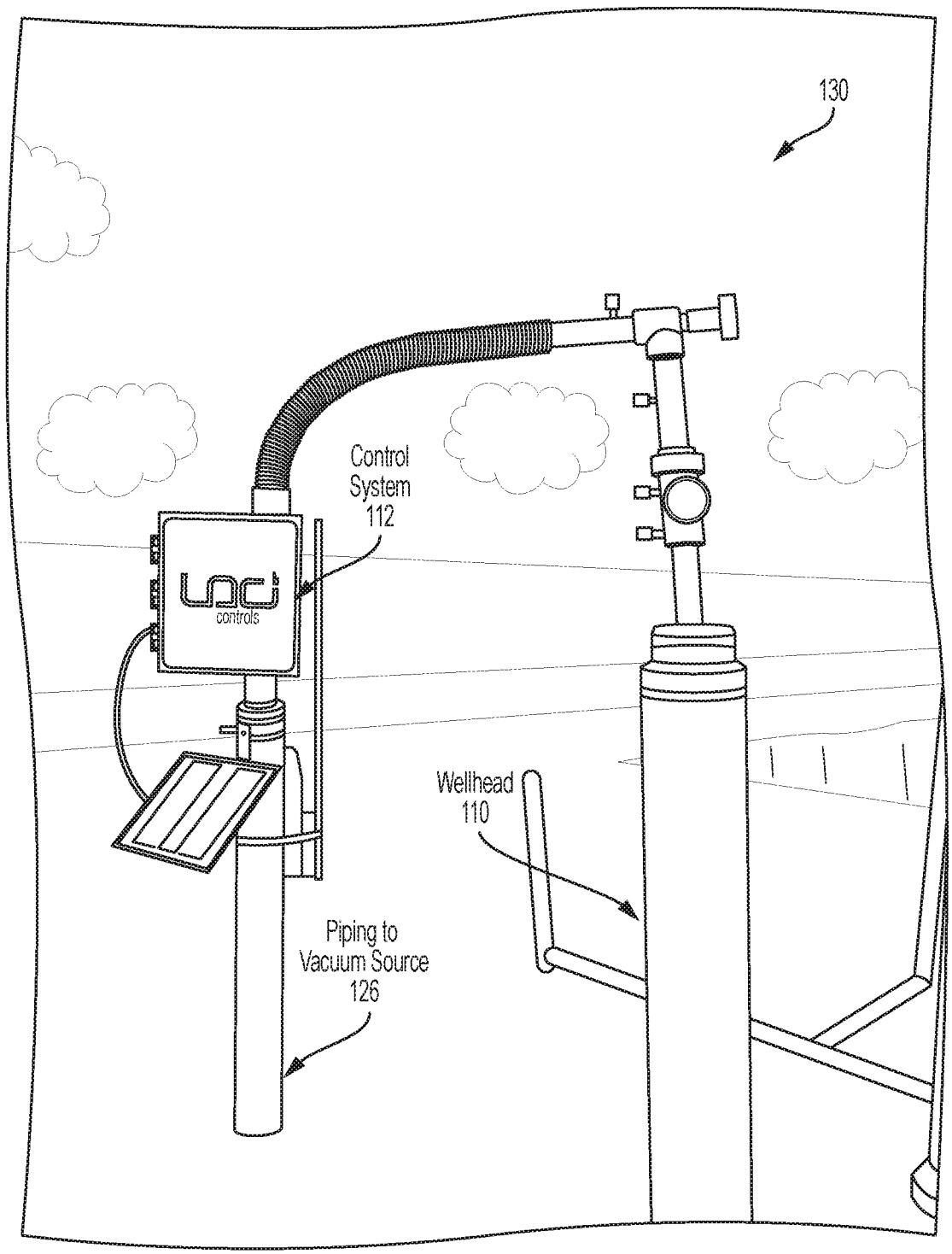
FIG. 1C shows another example control system for landfill gas extraction, in accordance with some embodiments of the technology described herein.

FIG. 1C illustrates an example implementation of the control system 112 for a landfill gas extraction system 130. In some embodiments, the gas analyzer and the controller described with reference to FIG. 1B are portions of the control system 112 shown in FIG. 1C. The gas extraction well 108 may be coupled to the vacuum source through the piping 126 that leads to the vacuum source. Landfill gas may flow from the gas extraction well 108 towards the vacuum source via the piping 126. In some embodiments, the control system 112 is disposed within the piping 126 such that the control system 112 controls the flow of gas from the wellhead 110 to the vacuum source via the piping 126. In some embodiments, the control system 112 may be configured to operate as described above with reference to FIG. 1B. For example, the control system 112 may be configured to use a gas analyzer and controller in the control system 112 to obtain measurements of one or more characteristics of the landfill gas being extracted via the gas extraction system and control extraction of the gas based on the measurements of the characteristic(s).

Figure 2A:
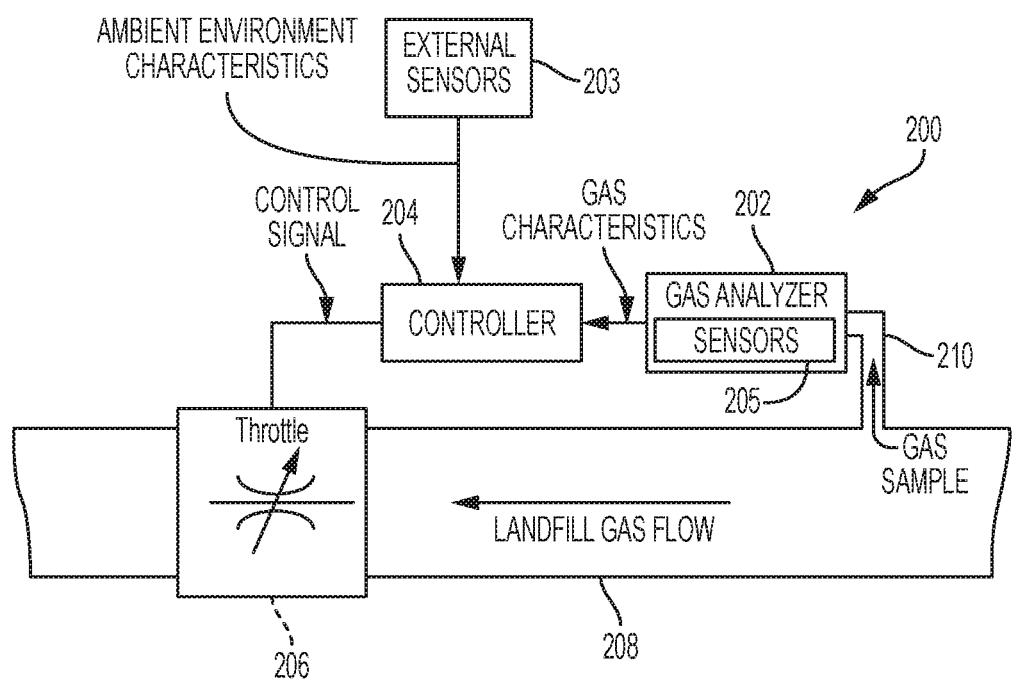
FIG. 2A is a block diagram illustrating components of an example landfill gas extraction control system, in accordance with some embodiments of the technology described herein.

FIG. 2A illustrates a block diagram of components of an example control system 200 for controlling extraction of gas via a gas extraction system, according to some embodiments of the technology described herein. In some embodiments, control system 200 may be a portion or all of control system 112 discussed above with respect to FIG. 1. For example, in some embodiments, the control system 200 may be configured to control flow of landfill gas from the landfill 102 through gas extraction well 108.

In some embodiments, the control system 200 includes a gas analyzer 202 for measuring one or more characteristics of landfill gas being extracted from the landfill. Measurements of the characteristic(s) of the landfill gas being extracted from the landfill may be used by a controller 204 to control a throttle 206. In some embodiments, the throttle 206 may be configured to control flow of landfill gas from the landfill to a gas collection system (e.g., gas collection system 114). In some embodiments, the throttle 206 may be configured to control an aperture through which landfill gas from the landfill flows when flowing towards the gas collection system. For example, the throttle 206 may be configured to control a variable portion of the aperture that is blocked in order to control a flow rate of the landfill gas flowing from the landfill to the gas collection system.

In some embodiments, the gas analyzer 202 may be configured to determine one or more characteristics of landfill gas and/or a surrounding environment of the landfill. For example, the gas analyzer 202 may be configured to determine the characteristic(s) of extracted landfill gas, gas in the landfill, landfill gas in different portions of the gas extraction system, and/or landfill gas in a gas collection system. In some embodiments, the gas analyzer 202 includes one or more sensors 205 to obtain measurements of the characteristic(s). In some embodiments, the gas analyzer 202 may be configured to obtain a sample of landfill gas from the gas extraction system 208 via an input port 210. The gas analyzer 202 may be configured to obtain measurements of the characteristic(s) of the collected gas sample using the sensor(s) 205. In some embodiments, the gas analyzer 202 may be configured to report the measurements of the characteristic(s) to the controller 204 for use in controlling the flow control mechanism 206.

In some embodiments, the gas analyzer 202 may be configured to obtain measurements for one or more characteristics of a collected gas sample or of landfill gas in the landfill. For example, the gas analyzer 202 may be configured to determine a temperature, pressure, flow rate, humidity, density, gas composition (e.g., concentration of methane, oxygen, carbon dioxide, carbon monoxide, hydrogen sulfide, nitrogen, and/or other gas) and/or any other suitable characteristic(s) of the collected gas sample. In some embodiments, the gas analyzer 202 may be configured to determine one or more characteristics of the landfill gas based on measurements obtained for a number of gas samples. For example, the gas analyzer 202 may be configured to determine an energy content of gas, or a concentration of methane in gas samples for a certain time period and/or across a number of collected gas samples. In some embodiments, the gas analyzer 202 may be configured to determine the characteristic(s) at a regular frequency. For example, the gas analyzer 202 may be configured to determine the characteristic(s) every second, every minute, every hour, every 12 hours, every 24 hours, every week, or at another frequency.

In some embodiments, the gas analyzer 202 may be configured to determine a gas composition of landfill gas being extracted from the landfill. In some embodiments, the gas analyzer 202 may be configured to determine a concentration of methane in a collected sample of gas. For example, the gas analyzer 202 may be configured to use the sensor(s) 205 to measure the concentration of methane in the sample of gas. The gas analyzer 202 may be configured to determine, using the determined concentration of methane, energy content of landfill gas being extracted from the landfill. The gas analyzer 202 may be configured to output the determined energy content to the controller 204 which may be configured to use the energy content to control the throttle 206.

In some embodiments, the control system 200 may include one or more external sensors 203 to measure one or more characteristics of the ambient environment outside of Gas Analyzer 202 (e.g., outside of the control system 200). The external sensor(s) 203 may provide obtained measurements to the control system 200 (e.g., to controller 204) and/or to one or more computing devices located remotely (e.g., by using a wireless links, a wired link, and/or any suitable combination of wireless and wired links). In some embodiments, external sensor(s) 203 may include one or more temperature sensors configured to measure temperature outside of the control system 200 (e.g., the ambient atmospheric temperature) and/or any other suitable location. In some embodiments, the external sensor(s) 203 may include one or more atmospheric pressure sensor(s) configured to measure atmospheric pressure outside of the control system 200 (e.g., ambient atmospheric pressure) and/or any other suitable location. In some embodiments, the external sensor(s) 203 may include one or more humidity sensors to measure ambient humidity outside of the landfill.

In some embodiments, the control system 200 may include one or more sensors placed directly in gas extraction piping to obtain measurements of characteristics of the gas at different stages of the extraction system. In some embodiments, the control system 200 may include remote components (e.g., a computing device) for processing data to obtain the measurement(s) of the gas characteristic(s).

In some embodiments, the controller 204 may be configured to determine one or more settings of one or more control parameters and/or apply the control parameter(s) to the throttle 206. In some embodiments, the controller 204 may be configured to use measurements of one or more gas characteristics (e.g., energy content of landfill gas, temperature of landfill gas) determined by the gas analyzer 202 to control the flow of landfill gas extracted from the landfill In some embodiments, the controller 204 may be configured to determine a flow rate at which landfill gas is to flow through the gas extraction system 208. The flow rate may comprise a target flow rate for extracting landfill gas. In some embodiments, the controller 204 may be configured to determine the target flow rate based on energy content of landfill gas being extracted from the landfill. If the energy content of the landfill gas being extracted is different from a target energy content, the controller 204 may be configured to adjust the flow rate to change the energy content of landfill gas being extracted from the landfill.

In some embodiments, the throttle 206 may include a mechanism by which to block a portion of an aperture through which landfill gas extracted from the landfill flows. In some embodiments, the throttle 206 may include a plate that blocks a variable portion of the aperture. The throttle 206 may be configured to control a position of the plate to control the variable portion of the aperture that is blocked. The plate, however, may have an area that is less than the cross sectional area of an aperture in the well piping. Accordingly, even when in a position of maximum closure, the plate does not fully block the flow of gas. In some embodiments, the plate may have an area that is greater than or equal to the cross sectional area of the aperture in the well piping. The plate may not completely seal off flow in the position of maximum closure. The aperture, for example, may be fully or partially bounded by shoulders against which the plate may rest in the position of maximum closure. The plate and surface(s) of the shoulders, may be configured so as not to form an airtight seal. As a result, the plate allows at least some flow of gas through the aperture.

Other structures may be used to control flow without fully blocking the flow. In some embodiments, the throttle 206 may include a ball valve that blocks a variable portion of the aperture. In some embodiments, the throttle 206 may be configured to allow at least some flow of landfill gas through the aperture when in a state of maximum closure. Examples of mechanisms by which to block the portion of the aperture are discussed herein.

In some embodiments, the throttle 206 may include one or more actuation devices configured to physically operate the throttle 206. For example, in embodiments in which the throttle includes a plate positioned within an aperture of a pipe, the actuation device(s) may be configured to rotate the plate, thus altering the percentage of the opening of the pipe blocked by the plate. For example, the actuation device(s) may comprise a motor that uses electrical power to adjust the rotational position of the plate. In another example, the actuation device(s) may comprise a pneumatic actuator that uses air pressure to act on a piston to adjust the position of the plate. In yet another example, the actuation device(s) may comprise a hydraulic actuator that uses hydraulic pressure to adjust the position of the plate. Some embodiments are not limited to any specific type of actuation device, as any actuation device suitable for a respective throttle 206 may be used.

In some embodiments, to change flow rate, the controller 204 may be configured to control a position of the throttle 206. In some embodiments, the controller 204 may be configured to determine the throttle position to set based on a target flow rate of landfill gas flowing through the gas extraction system 208. For example, the target flow rate may correspond to a setting that may achieve a target energy content in landfill gas being extracted from the landfill. In some embodiments, the controller 204 may be configured to control one or more actuation devices to apply the parameter(s) to the throttle 206. For example, in a system in which the actuation device(s) comprises a motor, the controller 204 may be configured to use the motor to change the throttle position.

Although, in the example embodiment illustrated in FIG. 2A, the controller 204 is shown to be co-located with the landfill gas extraction system 208, in some embodiments one or more components of the controller 204 may be remote from the physical gas extraction system 208. For example, the controller 204 may include a computing device configured to perform flow control calculations and communicate settings remotely to a device disposed in piping between a gas extraction well and a vacuum source. The device may be configured to control the flow control mechanism based on settings received from the computing device. The computer device may be configured to communicate settings via wireless communication or by wired communication. In another example, the computing device may be configured to remotely control one or more actuation devices to adjust positions of one or more valves of the flow control mechanism.

FIG. 2B illustrates components of the throttle 206 shown in FIG. 2A according to some embodiments. The throttle 206 includes a motor 206A, a gearbox 206B, a movable member 206C, and one or more sensors 206D. The controller 204 controls the motor 206A to modulate a position of the movable member 206C to control a flow rate of landfill gas flowing through the throttle (e.g., through the movable member). The gearbox 206B translates motion generated by the motor 206A to the movable member 206C causing the movable member 206C to change position. In some embodiments, the sensor(s) 206D measure a flow rate of landfill gas through the movable member 206C. In some embodiments, the sensor(s) 206D measure a pressure upstream of the throttle 206, downstream of the throttle 206, and/or a difference between the pressure upstream and downstream of the throttle 206. The controller 204 uses one or more measurements of flow rate obtained by the sensor(s) 206D for controlling the motor 206A.

In some embodiments, the motor 206A provides a force by which the position of the throttle can be adjusted. The controller 204 may be configured to command the motor to adjust a position of the movable member 206C. For example, the motor 206A may generate a torque by which the movable member 206C may be moved to adjust the position of the movable member 206C. In some embodiments, the motor 206A may comprise a step motor that divides a full rotation of the motor into a number of equal steps. The controller 204 may be configured to command the motor to move and/or hold at one of the steps.

In some embodiments, the gear box 206B may be configured to translate a force generated by the motor 206A to the movable member 206C to adjust the position of the movable member 206C. The gear box 206B may be coupled to the movable member 206B to allow the force generated by the motor 206A to be translated to the movable member 206B and cause movement of the movable member 206B. In some embodiments, the gear box 206B is mechanically coupled to the movable member 206C. For example, the gear box may be attached to the movable member 206C via shaft. When the motor 206A generates a force, the force is translated to the shaft via the gear box 206B, which causes the shaft to move. The movement of the shaft then causes the movable member 206C to move. In some embodiments, the gear box 206B may be magnetically coupled to the movable member 206C.

In some embodiments, the movable member 206C may be configured to restrict a flow of landfill gas. In some embodiments, the movable member 206C may block a variable portion of an aperture through which the landfill gas flows. A position of the movable member may set the variable portion of the aperture. In some embodiments, the controller 204 may control the position of the movable member to set a flow rate of the landfill gas extracted from a landfill gas extraction system. For example, the landfill gas may flow through the movable member, and the controller 204 may control a position of the movable member to set the variable portion of the aperture, which in turn sets the flow rate of the landfill gas flowing through the movable member. The movable member may have a position of maximum closure in which the movable member provides a maximum amount of restriction to the flow of landfill gas. For example, the position of maximum closure may be a position at which the movable member blocks a maximum portion of the aperture through which the landfill gas flows. In some embodiments, the movable member may be configured to ensure that at least some flow is allowed through the movable member at the position of maximum closure.

FIG. 2C illustrates a movable member 206C-1 in accordance with some embodiments. The movable member 206C-1 may be the movable member 206C in the throttle 206 of FIGS. 2A-B. The movable member 206C-1 may include a plate 206C-1A that is configured to rotate. The rotational position of the plate 206C-1A may set a flow rate of landfill gas extracted via the gas extraction system 208. In some embodiments, the controller 204 can be configured to command the motor 206A to generate a force that actuates the plate 206C-1A and causes the plate 206C-1A to rotate. In some embodiments, the rotational position of the plate 206C-1A may control a variable portion of an aperture through which the landfill gas flows. The plate 206C-1A may have a position of minimum restriction, and a position of maximum restriction. In some embodiments, the position of minimum restriction may correspond to a maximum flow rate that can be set by the flow control mechanism 206C-1, while the position of maximum restriction may correspond to a minimum flow rate that can be set by the flow control mechanism 206C-1.

FIG. 2D illustrates the movable member 206C-1 shown in FIG. 2C in a position of maximum restriction in accordance with some embodiments. The position of maximum restriction may be a rotational position of the plate 206C-1A which corresponds to a position of maximum closure of an aperture through which the landfill gas is flowing in the throttle 206. For example, as illustrated in FIG. 2D, the position of maximum closure of the plate 206C-1A is when the plate 206C-1A is at a 90 degree angle relative to a longitudinal axis of the pipe. In this position, the plate 206C-1A blocks a maximum portion of the aperture through which the landfill gas flows. In some embodiments, at the position of maximum closure, the throttle maintains one or more gaps 206C-1B through which landfill gas may continue to flow. In this manner, the flow control mechanism 206C-1 allows at least some flow of landfill gas at the position of maximum closure.

Figure 2E:
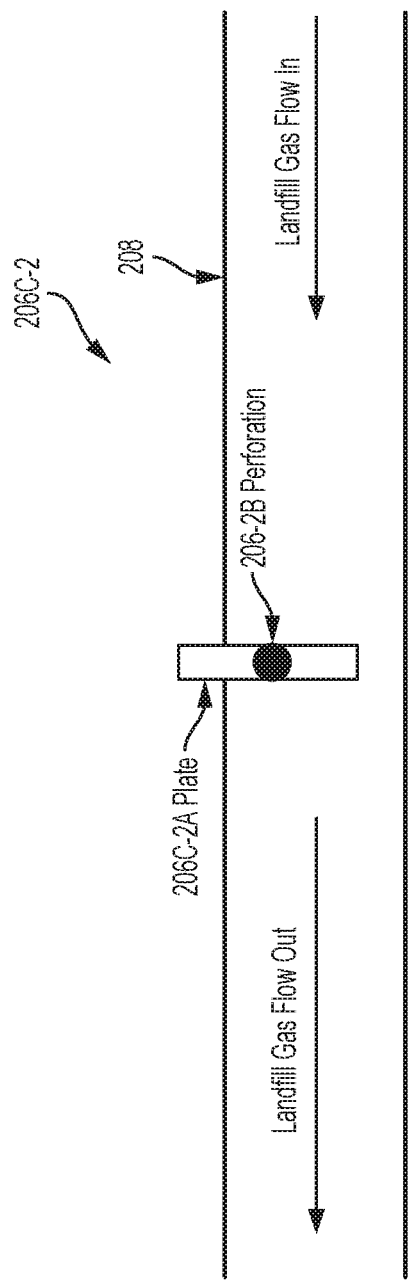
FIG. 2E is a schematic illustration of an alternative embodiment of a movable member for restricting flow with the movable member in a state in which flow is enabled.

FIG. 2E illustrates a movable member 206C-2 in accordance with some embodiments. The movable member 206C-2 may be the movable member 206C in the throttle 206 of FIGS. 2A-B. The movable member 206C-2 may include a plate 206C-2A that is configured to slide along a plane. In some embodiments, the plate 206C-2A may be configured to move along an axis that intersects a flow of landfill gas as illustrated in FIG. 2E. The position of the plate 206C-2A may set a flow rate of landfill gas extracted via the gas extraction system 208. For example, the plate 206C-2A may act as a gate blocking a portion of an aperture through which the landfill gas flows. In some embodiments, the controller 204 can be configured to command the motor 206A to generate a force that actuates the plate 206C-2A and causes the plate 206C-2A to move. In some embodiments, the position of the plate 206C-2A may control a variable portion of an aperture through which the landfill gas flows. The plate 206C-2A may have a position of minimum closure, and a position of maximum closure. In some embodiments, the position of minimum closure may correspond to a maximum flow rate that can be set by the movable member 206C-2, while the position of maximum closure may correspond to a minimum flow rate that can be set by the movable member 206C-2.

Figure 2F:
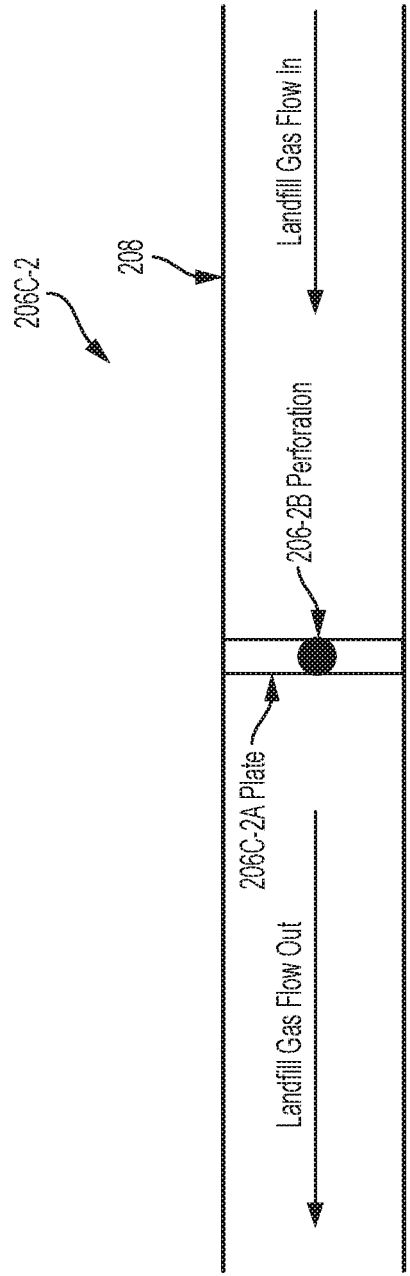
FIG. 2F is a schematic illustration of the movable member for restricting flow illustrated in FIG. 2E with the movable member at a position of maximum closure in which flow is restricted.

FIG. 2F illustrates the movable member 206C-2 shown in FIG. 2C in a position of maximum closure in accordance with some embodiments. The position of maximum closure may be a position of the plate 206C-2A which corresponds to a position of maximum closure of an aperture through which the landfill gas is flowing in the throttle 206. For example, as illustrated in FIG. 2F, the position of maximum closure of the plate 206C-2A is when the plate 206C-2A stretches across an entire aperture through which the landfill gas flows. In this position, the plate 206C-2A blocks a maximum portion of the variable portion of the aperture through which the landfill gas flows. In some embodiments, the plate 206C-2A may include a perforation 206-2B which allows at least some flow of landfill gas through the aperture when the plate 206C-2A is in the position of maximum closure. In this manner, the flow control mechanism 206C-2 allows at least some flow of landfill gas at the position of maximum closure. In some embodiments, the plate 206C-2A may include more than one perforation to ensure that at least some landfill gas flows through the throttle during operation of the landfill gas extraction system.

Figure 2G:
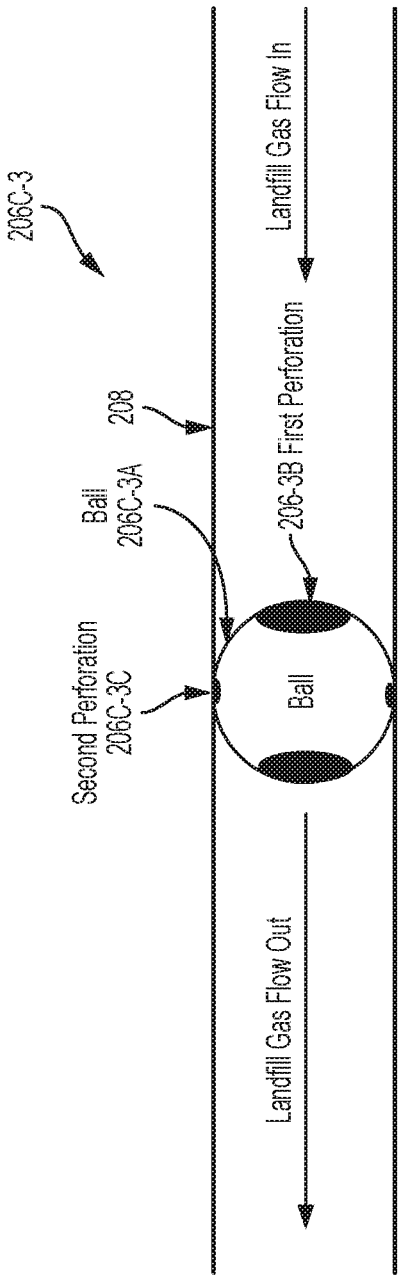
FIG. 2G is a schematic illustration of an alternative embodiment of a movable member for restricting flow with the movable member in a state in which flow is enabled.

FIG. 2G illustrates a movable member 206C-3 in accordance with some embodiments. The movable member 206C-3 may be the movable member 206C in the throttle 206 of FIGS. 2A-B. The movable member 206C-3 may include a ball 206C-3A that is configured to rotate to set a flow rate of landfill gas flowing across the ball. In some embodiments, the ball 206C-3A may include a first perforation 206C-3A. The throttle 206 can be configured to rotate the ball 206C-3A to set a portion of the first perforation 206C-3A through which landfill gas can flow. The position of the ball 206C-3A may set a flow rate of landfill gas extracted via the gas extraction system 208. In some embodiments, the controller 204 can be configured to command the motor 206A to generate a force that rotates the ball 206C-3A. In some embodiments, the position of the ball 206C-3A may control a variable portion of an aperture through which the landfill gas flows. The ball 206C-3A may have a position of minimum closure at which the landfill gas is allowed to flow through the whole first perforation 206C-3B, and a position of maximum closure at which the landfill gas is completely prevented from flowing through the first perforation 206C-3B of the ball valve. In some embodiments, the position of minimum closure may correspond to a maximum flow rate that can be set by the flow control mechanism, while the position of maximum closure may correspond to a minimum flow rate that can be set by the flow control mechanism 206C-3.

Figure 2H:
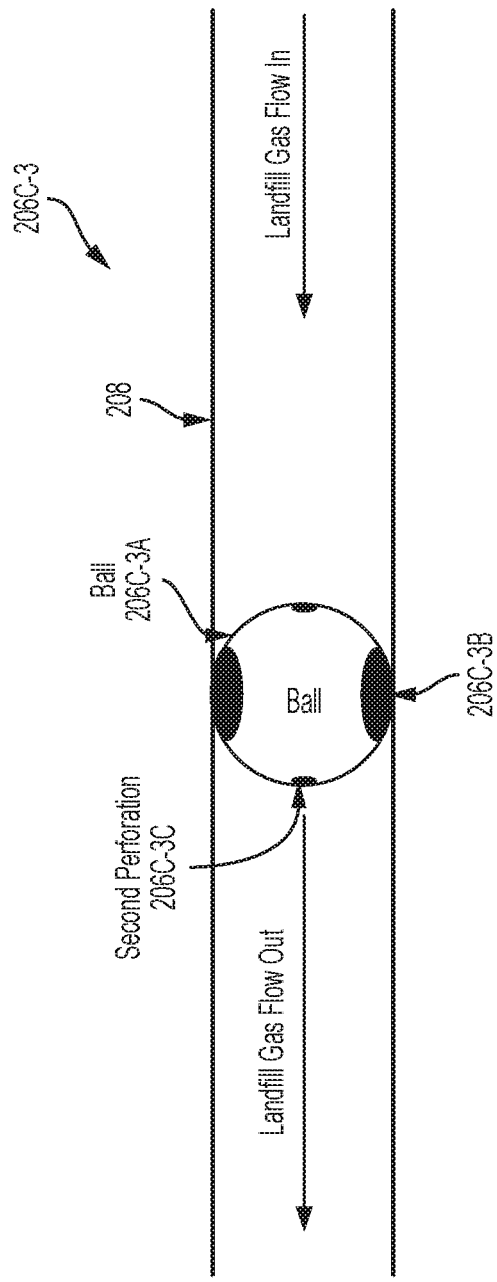
FIG. 2H is a schematic illustration of the movable member for restricting flow illustrated in FIG. 2G with the movable member at a position of maximum closure in which flow is restricted.

FIG. 2H illustrates the movable member 206C-3 shown in FIG. 2G in a position of maximum closure in accordance with some embodiments. The position of maximum closure may be a position of the ball 206C-3A which corresponds to a position of maximum closure of an aperture through which the landfill gas is flowing in the throttle 206. For example, as illustrated in FIG. 2F, the position of maximum closure of the ball 206C-2A is when no landfill gas can flow through the first perforation 206C-3B. In this position, the ball 206C-3A blocks a maximum portion of the variable portion of an aperture through which the landfill gas flows. The ball 206-3A may be configured in any suitable way such that, in this position of maximum closure, gas may flow through the valve. In some embodiments, flow may be permitted because the ball 206-3A may have a limited rage of rotation such that, at least a portion of the perforation is open to the piping on each side of the valve, allowing some gas to flow through the perforation. In other embodiments, the ball 206C-3A may alternatively or additionally include a second perforation 206C-3C which allows at least some flow of landfill gas through the aperture when the ball 206C-3A is in the position of maximum closure. In this manner, the movable member 206C-3 allows at least some flow of landfill gas at the position of maximum closure. In some embodiments, the second perforation 206C-3C is smaller than the first perforation 206C-3B. In some embodiments, the second perforation 206-2B may comprise more than one perforation, which ensures at least some landfill gas can flow through the throttle in all operating states during operation.

Figure 2I:
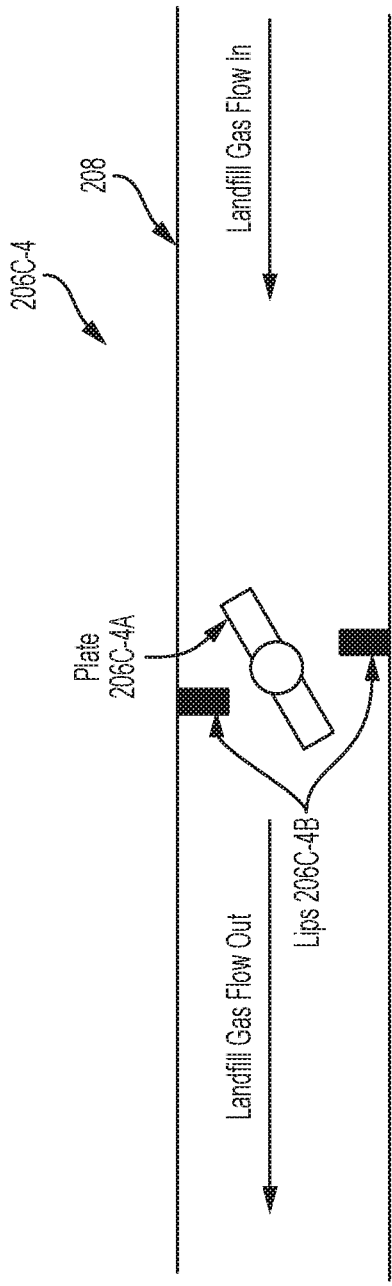
FIG. 2I is a schematic illustration of an alternative embodiment of a movable member for restricting flow with the movable member in a state in which flow is enabled.

FIG. 2I illustrates a movable member 206C-4 in accordance with some embodiments. The movable member 206C-4 may be the movable member 206C in the throttle 206 of FIGS. 2A-B. The movable member 206C-4 may include a plate 206-4A that is configured to rotate. The rotational position of the plate 206C-4A may set a flow rate of landfill gas extracted via the gas extraction system 208. In some embodiments, the controller 204 can be configured to command the motor 206A to generate a force that actuates the plate 206C-4A and causes it to rotate. In some embodiments, the rotational position of the plate 206C-4A may control a variable portion of an aperture through which the landfill gas flows. The plate 206C-4A may have a position of minimum closure at which a maximum amount of landfill gas is allowed to flow past the plate 206C-4A, and a position of maximum closure at which the plate 206C-4A provides the greatest amount of restriction to flow of landfill gas via the landfill gas extraction system 208. In some embodiments, the position of minimum closure may correspond to a maximum flow rate that can be set by the movable member while the position of maximum closure may correspond to a minimum flow rate that can be set by the movable member.

In some embodiments, the throttle 206 may include one or more structures 206C-4B for restricting rotational movement of the plate 206C-4A. In some embodiments, the structure(s) 206C-4B may be physical lips that prevent the plate 206C-4A from rotating beyond a certain point. For example, the lips can prevent the plate 206C-4A from rotating beyond a certain number of degrees from a position minimum closure of an aperture through which landfill gas flows.

Figure 2J:
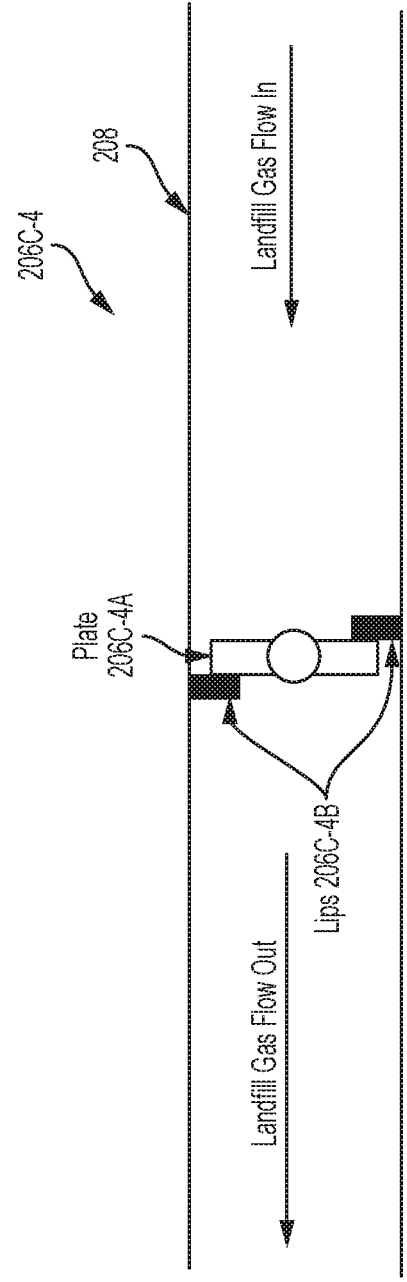
FIG. 2J is a schematic illustration of an alternative embodiment of a movable member for restricting flow with the movable member at a position of maximum closure in which flow is restricted.

FIG. 2J illustrates the plate 206C-4A shown in FIG. 2I in a position of maximum closure. As illustrated in FIG. 2I, in the some embodiments the area of the plate 206C-4A may be greater than the area of an aperture through which landfill gas can flow. In some embodiments, the aperture may be between the lips 206C-4B through which landfill gas flows. The lips 206C-4B may prevent the plate 206C-4A from rotating past a certain position. For example, at the lips may prevent the plate 206C-4A from rotating more than 90 degrees from the position of minimum closure. In some embodiments, the lips 206C-4B may be configured to prevent the plate 206C-4A from rotating past the position of maximum closure. At the position of maximum closure, the plate 206C-4A may be in contact with the lips 206C-4B, which restrict the plate 206C-4A from rotating further in one direction.

In some embodiments, at least some landfill gas can flow past the plate 206C-4A in the position of maximum closure. The lips 206C-4B and/or the plate 206C-4A may have ridges on the surface such that when the plate 206C-4A is in contact with the lips 206C-4B at the position of maximum closure, there may be openings between the plate 206C-4A and the lips 206C-4B that allow at least some flow of landfill gas.

In some embodiments, the sensor(s) 206D can include one or more flow measurement devices configured to measure a flow rate of landfill gas flowing across the throttle. For example, the flow measurement device(s) may be configured to measure a flow rate of landfill gas flowing across a movable member 206C (e.g., a plate, or a ball valve). In some embodiments, the flow measurement device(s) may comprise an orifice plate flow meter. In some embodiments, the flow measurement device(s) may comprise a venturi meter, a pitot tube, an optical flow meter, and/or a thermal mall flow meter. Some embodiments are not limited to particular types of flow measurement devices.

In some embodiments, the sensor(s) 206D can include one or more pressure measurement devices. In some embodiments, the pressure measurement device(s) may be configured to measure a difference in pressure between landfill gas upstream of the throttle 206 and downstream of the throttle 206. For example, the pressure measurement device(s) may be configured to measure a pressure differential across the movable member 206C (e.g., a plate, or a ball valve). In some embodiments, the pressure measurement device(s) may be configured to measure the pressure upstream and/or downstream of the throttle. For example, the pressure measurement device(s) may be configured to measure the pressure upstream and/or downstream of the movable member 206C (e.g., a plate or ball valve). In some embodiments, the pressure measurement device(s) may comprise a strain gauge, a capacitive pressure sensor, an electromagnetic pressure sensor, a piezoelectric pressure sensor, an optical pressure sensor, a thermal pressure sensor, and/or an ionization pressure sensor.

In some embodiments, one or more sensor measurements are provided to the controller 204 for use by the controller 204 in controlling the flow of landfill gas through the throttle. For example, the sensor(s) 206D may be configured to measure a flow rate of landfill gas flowing through the movable member 206C and/or a difference in pressure between upstream and downstream of the movable member 206C. The controller 204 may be configured to use the measurements to adjust a position of the movable member 206C to modulate the flow rate of the landfill gas. In some embodiments, the measurements be used by the controller 204 to control the throttle 206 to achieve an objective of the control system. For example, the controller 204 may be configured to use the measured flow rate from the flow measurement device(s) 206D to control the throttle 206 to achieve a target energy content. In another example, the controller 204 may be configured to use the measurements to control the throttle 206 to achieve a target flow rate. In yet another example, the controller 204 may be configured to use the measurements to achieve a target difference in pressure between upstream and downstream of the throttle 206. In another example, the controller 204 may be configured to use the measurements to achieve a target pressure upstream and/or downstream of the throttle 206.

The flow measurement may be provided to a control system, which uses the flow measurement to determine adjustments to one or more parameters of the gas extraction system in accordance with a control algorithm. One such parameter that may be adjusted is a flow control mechanism to control the amount of gas passing from the landfill to the output of the gas extraction system. In accordance with embodiments described herein, the entire system may be configured to foreclose the flow control mechanism from blocking flow to such a degree that the pressure at the well becomes positive. Throttles as described herein may be constructed to allow sufficient flow, even at a position of maximum closure, between the well and a vacuum source to preclude the pressure at the well from becoming positive. Such a result may be achieved regardless of the control algorithm in the controller. However, it should be appreciated that a negative pressure may be maintained at the well in other ways, including controlling a flow control mechanism so as not to control the flow control mechanism to fully block the piping during operation.

Figure 3A:
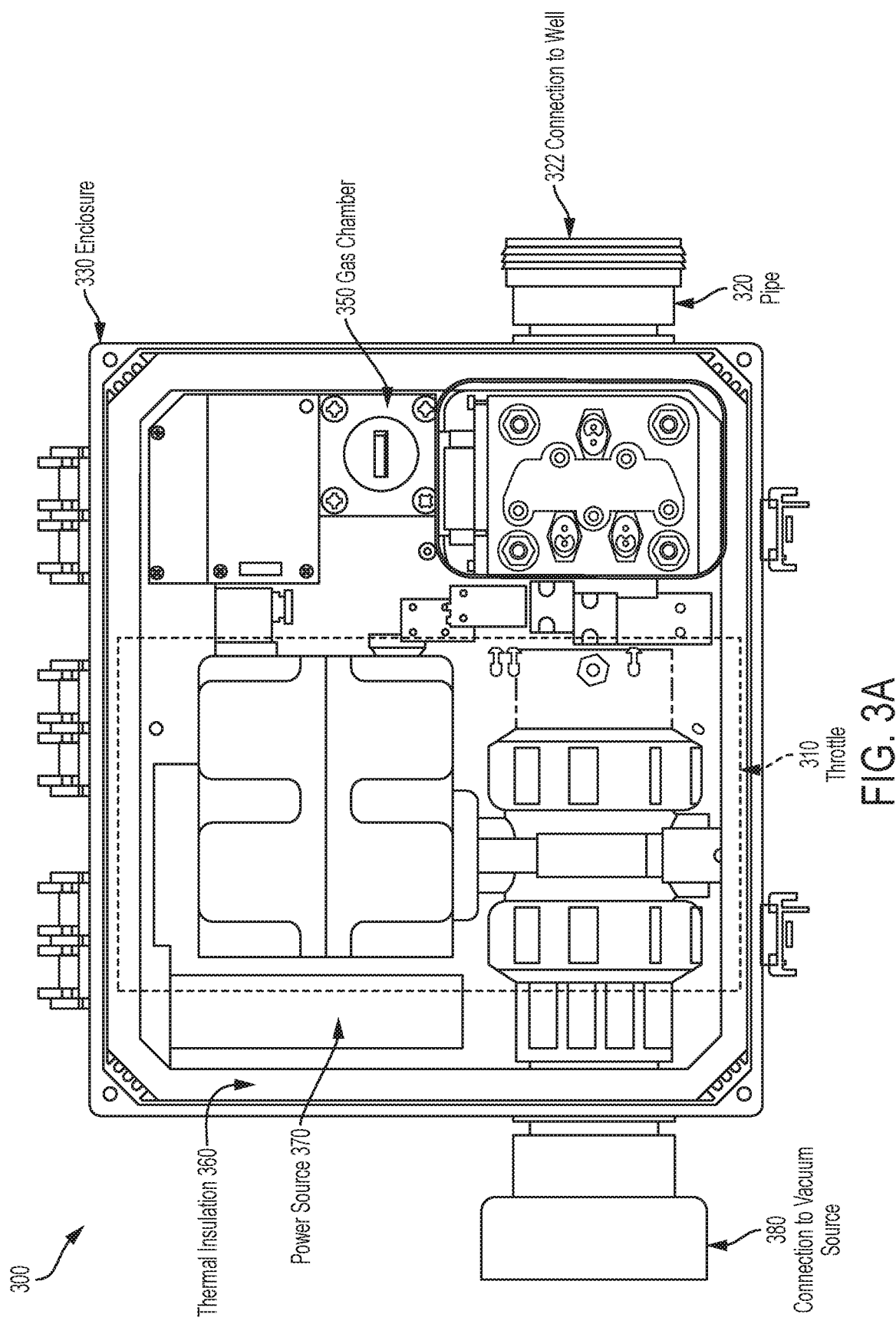
FIG. 3A is aerial plan view illustrating components of an example landfill gas extraction control system, in accordance with some embodiments of the technology described herein.

FIG. 3A illustrates an exemplary control system 300 for controlling extraction of landfill gas from a landfill according to some embodiments. Landfill gas reaches the system 300 via a pipe 320 that provides a connection to the well 322. The control system 300 may include a gas analyzer (e.g., gas analyzer 202) that measures one or more characteristics of landfill gas being extracted from the landfill. The gas analyzer can comprise a gas chamber 350 that collects a sample of landfill gas. The system 300 can be configured to measure the characteristic(s) of the landfill gas being extracted from the landfill by obtaining measurements of the characteristic(s) of a sample of landfill gas in the gas chamber 350. Landfill gas extracted from the landfill may flow via the pipe 320 to a connection (e.g., a pipe) 380 towards a vacuum source (e.g., vacuum source 114). The landfill gas may flow towards the connection to the vacuum source 380 via a throttle 310. The system 300 may be configured to control the flow of landfill gas using the throttle 310.

In some embodiments, the system 300 includes an enclosure 330 that encloses various components of the control system 300. In some embodiments, the enclosure 330 receives a section of the pipe 320. In some embodiments, the enclosure 330 may comprise a seal, sufficiently blocking the flow of gas and/or liquids from the leaving the enclosure 330.

In some embodiments, the control system 300 includes a power source 370 to power one or more components of the system 300. In some embodiments, the power source 370 may comprise a battery. In some embodiments, the power source 370 may comprise a solar power source. The solar power source may comprise one or more photovoltaic cells that convert solar power into electrical power. In some embodiments, both a solar power source and a battery may be present. The solar power source may be used to charge the battery, which may then be used to provide power at periodic intervals when the control systems operates to compute adjustments to parameters of the gas extraction system and control actuators that make those adjustments, such as by changing the position of a movable member in a throttle. The power source 370 may be configured to direct the electrical power to the component(s) of the system 300. For example, the power source 370 can be configured to provide power to the throttle 310 to power an actuation device (e.g., motor) of the throttle 310. In another example, the power source 370 may be configured to provide power to a gas analyzer (e.g., gas analyzer 202) to power one or more sensors for obtaining measurements of characteristics of the landfill gas. In some embodiments, the power source 370 may be configured to power other components in addition to or instead of those described herein.

In some embodiments, the control system 300 includes thermal insulation 360. The thermal insulation 360 may prevent heat from exiting the enclosure 330. The thermal insulation 360 can be configured to facilitate maintaining one or more components of the system 300 at a minimum temperature required for operation. For example, a motor in the throttle 310, one or more sensors, and/or the power source 370 may require a minimum temperature be maintained in the enclosure 330 to insure proper operation. In some embodiments, the thermal insulation 360 may comprise an insulative foam material, fiberglass, wool, cellulose, and/or other insulative material. Some embodiments are not limited to a particular type of insulative material.

Figure 3B:
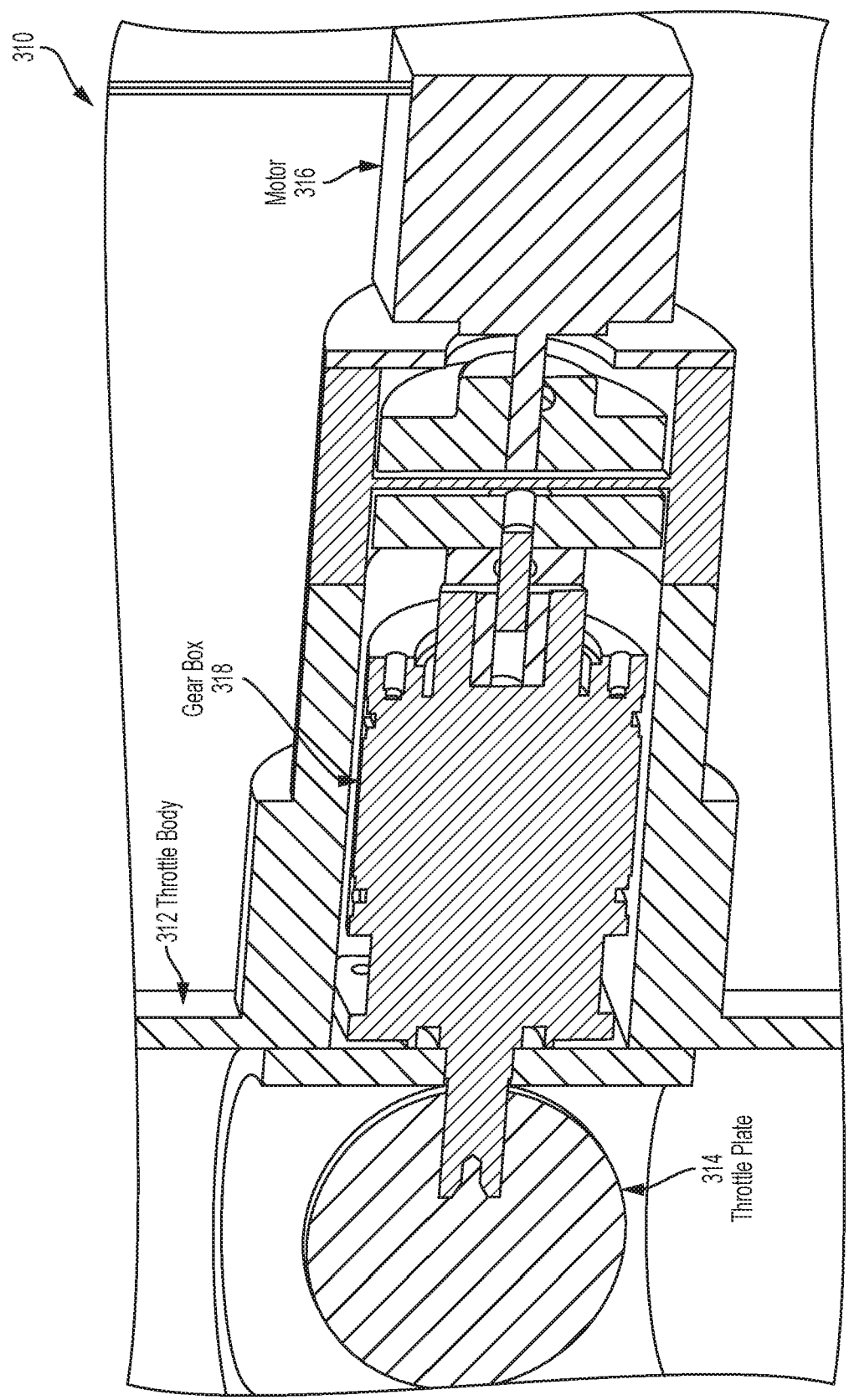
FIG. 3B is illustrates a cross section of throttle 310 illustrated in FIG. 3A, in accordance with some embodiments of the technology described herein.

FIG. 3B illustrate various components of the throttle 310 configured to control flow of landfill gas disposed in the control system 300. For example, the throttle 310 can be configured to control flow of the landfill gas entering the control system 300 through pipe 320 (FIG. 3A). The throttle 310 may include a throttle body 312, coupled to pipe 320, providing an aperture through which landfill gas flows. The throttle 310 includes a movable member, here shown as a plate 314, which controls a variable portion of the aperture that is blocked. In some embodiments, the aperture may comprise a cross section of the throttle body 312 through which the landfill gas flows.

Throttle 310 includes a motor 316 that is used to adjust a position of the plate 314 to control the variable portion of the aperture that is blocked. The throttle 310 includes a gear box 318 that translates a force generated by the motor 316 to the plate 314 to cause the plate to move.

Figure 3C:
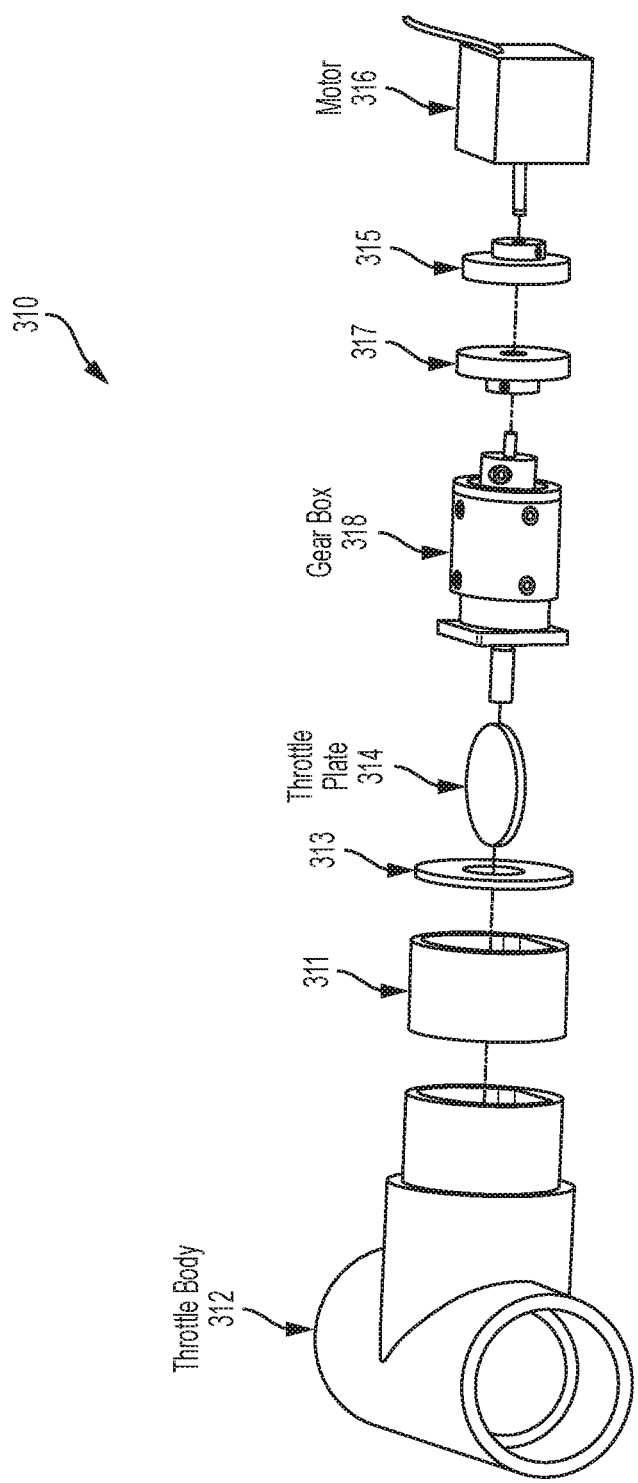
FIG. 3C is an exploded view of throttle 310 of FIG. 3B.

FIG. 3C is an exploded view of the components shown in FIG. 3B. The throttle 310 includes a mounting base 311, a mounting cap 313, and shaft couplers 315-317. The mounting base 311 may provide an enclosure around driving portions of the throttle 310. For example, the mounting base 311 may provide an enclosure for the gear box 318, and the shaft couplers 315-317. The mounting cap 313 may provide an enclosure over the top of driving portions of the throttle 310. For example, the mounting cap 313 may cover the top of the gear box 318, and the shaft couplers 315-317. The shaft couplers 315-317 couple the motor 316 to the gear box 318 to translate motion generated by the motor to the gear box 318. In some embodiments, the shaft couplers 315-317 may be mechanical couplers. In some embodiments, the shaft couplers 315-317 may be magnetic couplers.

In some embodiments, the throttle body 312 may be placed in a flow path of landfill gas from the landfill to a gas collection system 114 between the pipe 320 and the connection 380 the vacuum source. In some embodiments, the throttle body 320 may be disposed in the pipe 320. In some embodiments, the throttle body 320 may be disposed in the connection to the vacuum source 380. In some embodiments, the throttle body 320 may comprise a piping material. In some embodiments, the piping material may comprise a plastic polymer such as polyvinyl chloride (PVC), chlorinated polyvinyl chloride (CPVC), high-density polyethylene (HDPE), or other material. Some embodiments are not limited to a particular material of the throttle body 312.

In some embodiments, the plate 314 blocks a variable portion of an aperture through which the landfill gas flows. For example, the plate 314 blocks a variable portion of a cross section of the throttle body 312 through which the landfill gas flows. In some embodiments, the plate 314 may be configured to rotate. For example, the plate may be attached to a shaft that rotates and, in turn, causes the plate to rotate. A rotational position of the plate may set the variable portion of the aperture that is blocked. For example, the rotational position of the plate 314 may determine a portion of a cross-sectional area of the throttle body 312 that is blocked. In some embodiments, the plate 314 may have a rotational position maximizing the portion of the aperture (e.g., cross-sectional area of the throttle body 312) that is blocked, and a position minimizing the portion of the aperture that is blocked. The rotational position of maximum blockage may correspond to a position in which the surfaces of the plate make an angle of 90 degrees with respect to the longitudinal axis of the throttle body. The rotational position of minimum blockage may correspond to a position in which the surfaces of the plate make an angle of 0 degrees with respect to the longitudinal axis of the throttle body.

In some embodiments, the plate may have a diameter less than 3 inches. In some embodiments, the plate may have a diameter less than 2 inches. In some embodiments, the plate may have a diameter less than any diameter between 1 and 10 inches. Some embodiments are not limited to a particular range of plate sizes.

In some embodiments, the throttle 310 may be configured to provide for rotational positions of the plate 314 on a continuous scale. The rotational position of the plate 314 may determine the portion of the aperture that is blocked on a continuous scale. By setting the portion of the aperture that is blocked on a continuous scale, a controller may control flow rate of the landfill gas flowing from the landfill to the vacuum source on a continuous scale. For example, the throttle 310 may have rotational positions of the plate 314 between 0-90 degrees. Each position may correspond to a size of the aperture that is blocked, which in turn corresponds to a flow rate of the landfill gas flowing through the throttle body 312.

In some embodiments, the plate 314 may comprise a material resistant to corrosion. For example, the plate 314 may comprise a material that is not corroded away as a result of exposure to landfill gas and/or constituents of landfill gas. In some embodiments, the plate 314 may comprise stainless steel, titanium, plastic, a polymer, for example. Some embodiments are not limited to a material of the plate 314.

In some embodiments, the motor 316 provides a force by which the throttle 310 position can be adjusted. The control system 300 (e.g., controller 204) may be configured to command the motor to adjust the throttle 310 position. The motor 316 may be configured to adjust the position of the throttle 310 by adjusting the position (e.g., rotational position) of the plate 314. For example, the motor 316 may generate a torque by which the plate 314 can be rotated to adjust the rotational position of the plate 314. In some embodiments, the motor 316 may comprise a step motor that divides a full rotation of the motor into a number of equal steps. The control system 300 can be configured to command the motor to move to and/or hold at one of the steps. Example sizes, and power usage of the motor 316 are discussed herein.

In some embodiments, the gear box 318 may be configured to translate a force generated by the motor 316 to the plate 314 to adjust the position of the plate 314. The gear box 318 may be coupled to the plate 314 to allow the force generated by the motor 316 to be translated to the plate 314 and cause the plate 314 to move (e.g., rotate). In some embodiments, the gear box 318 is mechanically coupled to the plate 314 as illustrated in FIG. 3B. For example, the gear box 318 may be coupled to the plate 314 via a shaft attached to the plate 314. When the motor 316 generates a force, the force is translated to the shaft via the gear 318, which causes the shaft to rotate. The rotation of the shaft then causes the plate 314 to rotate.

In some embodiments, the gear box 318 may be configured to prevent back-drive of the plate 314. For example, once the throttle 310 has set the plate 314 at a position, the gear box 318 may be configured to prevent movement of the plate 314 without force generated by the motor 314. A non-back-drivable gearbox may be achieved in any suitable way, including based on a gear ratio, gear pitch and/or with a braking mechanism that is spring biased into a locked position that is released for motion. In some embodiments, the motor 316 may only draw power when modifying a position of the plate 314 as the gear box 318 may prevent motion of the plate 314 after reaching a set position. This may significantly reduce the power needs to modify a position of the throttle as the motor 316 does not need to generate a force to maintain the plate 314 at a given position. For example, a controller may control the position of the throttle by commanding the motor 316 to adjust a rotational position of the plate 314. The controller may control the position of the throttle 310 such that the plate 314 is set to a target position. Upon reaching the target position, the motor 316 may stop generating force (e.g., by being turned off), and the plate 314 may be held in place by the gear box 318. For example, the gear box 318 may prevent the plate 314 from rotating as a result of torque applied from a flow of landfill gas through the throttle body 312.

Figure 4A:
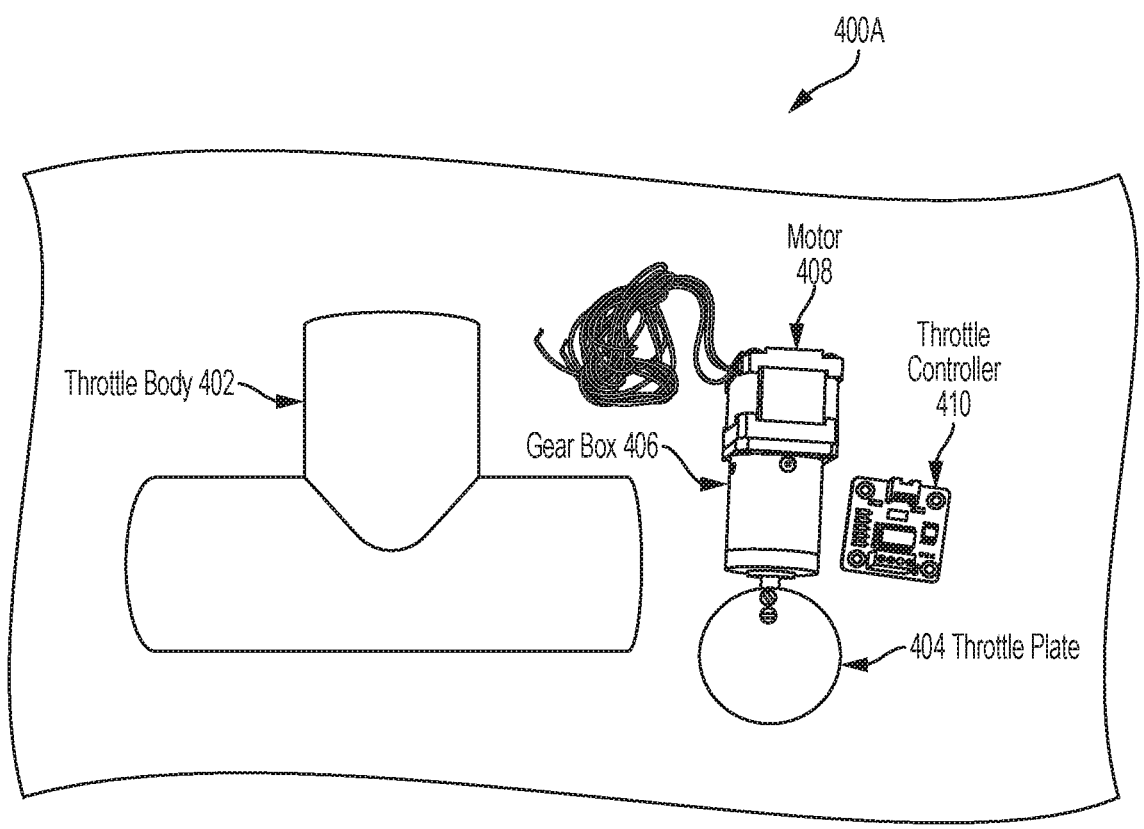
FIG. 4A illustrates separated components of a throttle, in accordance with some embodiments of the technology described herein.
Figure 4B:
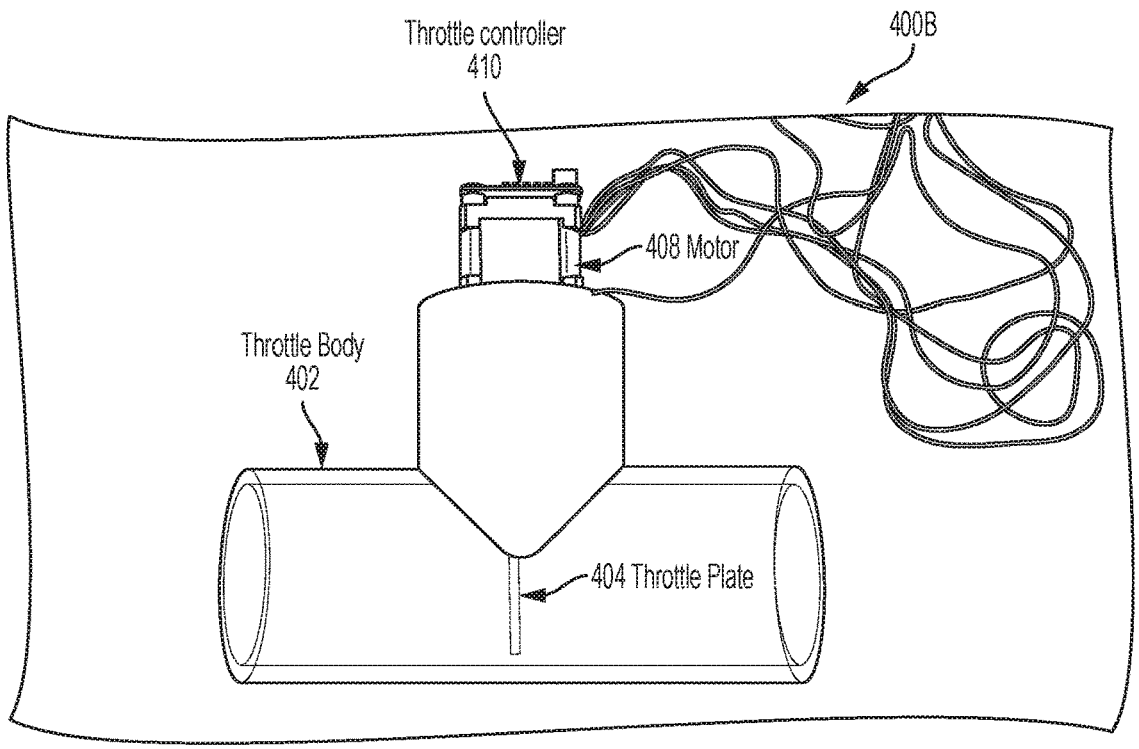
FIG. 4B is a side view the components shown in FIG. 4A assembled to form the throttle, in accordance with some embodiments of the technology described herein.
Figure 4C:
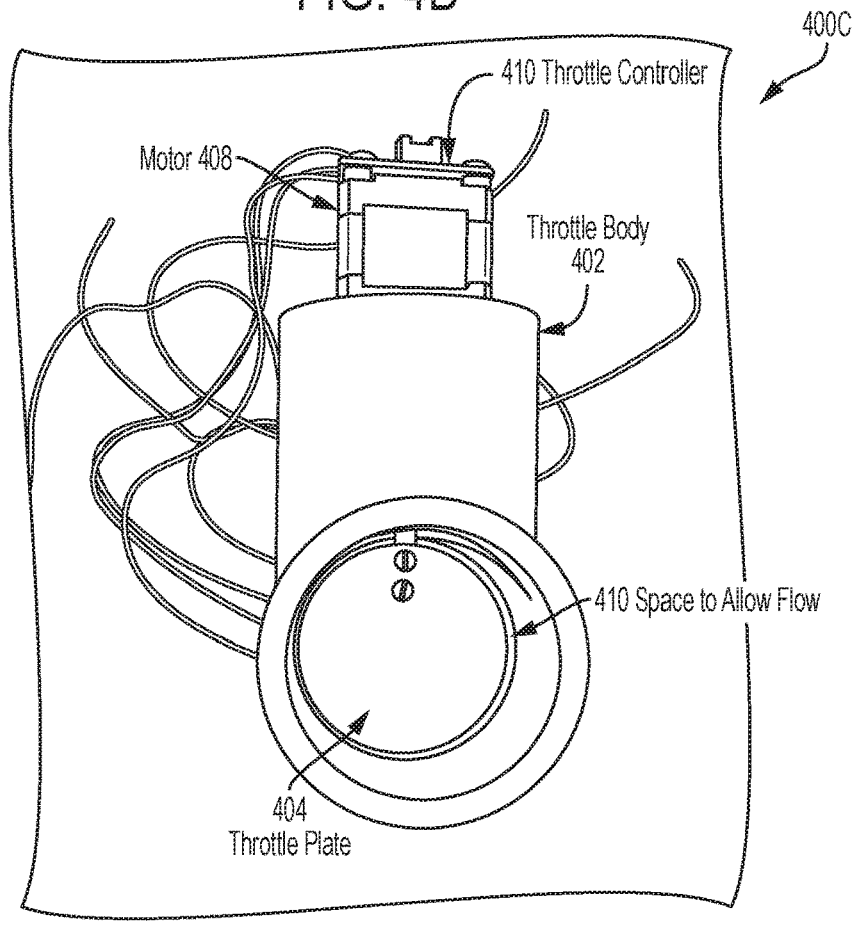
FIG. 4C is an end view of the assembled throttle shown in FIG. 4B.

FIG. 4A illustrates a view 400 of exemplary separate components of a throttle according to some embodiments. The components include a throttle body 402, a throttle plate 404, a gear box 406, a motor 408, and a throttle controller 410. FIG. 4B illustrates a view 400B of the throttle with the components shown in FIG. 4A assembled, while FIG. 4C illustrates a side view 400C of the assembled throttle shown in FIG. 4B.

In some embodiments, the throttle body 402 may comprise piping (e.g., PVC, CPVC, and/or HDPE) through which landfill gas extracted from the landfill may flow. The piping may be shaped as T, as shown in FIG. 4A, with a first portion of the T providing an aperture through which gas may flow from the well head to the gas collection system. A second portion of the T, orthogonal to the first portion, may serve as a housing for the gearbox 406, motor 408, and, in the illustrated embodiment, a throttle controller 410. Landfill gas may flow into one opening of the throttle body 402 and flow out of a second opening of the throttle body 402. In some embodiments, the motor 408 may be coupled to a gear box 406, which in turn is coupled to a throttle plate 404. The motor 408 may be configured to use electrical energy to generate a force (e.g., a torque). The force generated by the motor 408 may be transferred to the plate 404 via a gear box 406. In some embodiments, the gear box 406 may be configured to convert a first torque generated by the motor 408 to a second torque that is used to move the plate 404. In some embodiments, the gearbox may be coupled to the plate 404 via a shaft that is attached to the plate 404. For example, the shaft may be attached to the plate using screws that fix the shaft to the plate 404. Torque generated by the motor 408 may be converted by the gearbox 406 into a second torque that causes the shaft to rotate and, in turn, causes the plate 404 to rotate. In some embodiments, the shaft may not be mechanically coupled to the plate 404. The shaft may be magnetically coupled to the plate 404 such that rotation of the shaft causes rotation of the plate 404.

In some embodiments, the throttle includes a controller 410 configured to control the force generated by the motor 408. In some embodiments, the controller 410 may include a controller circuit that is configured to control a supply of electrical energy to the motor 408 to control a force generated by the motor 408. In some embodiments, the controller circuit 410 may include a switch by which the controller circuit 410 turns on or turns off electrical power to the motor 408. For example, the switch may connect or disconnect a voltage source to the motor 408. In some embodiments, the controller circuit 410 may control a speed at which the motor 408 spins or for how long the motor spins. For example, the controller circuit 410 may be configured to control a voltage and/or current level delivered to the motor 408 to cause the motor 408 to spin in a desired direction through an angular extent that, when translated by the gear box, causes the throttle plate 404 to rotate a desired number of degrees. Such a configuration may support a control loop, for example, in which a controller (204) determines an adjustment to the gas flow and generates signals to controller circuit 410 to cause the throttle to adjust to increase or decrease the flow of gas to enable that adjustment. With the throttle as shown in FIG. 4A, however, regardless of the control signal, the throttle will not completely block the flow of gas.

In some embodiments, the controller circuit 410 may be placed upon the motor 408 as illustrated in view 400B (FIG. 4B). The controller circuit 410 may be connected to the motor 408 to control the rotation of motor 408. In some embodiments, the motor 408 may comprise the controller circuit 410. The controller circuit 410 and/or the motor 408 may be connected to a power source (e.g., power source 370) via which the controller circuit 410 and/or the motor 408 draw power to adjust a position of the plate 404.

In some embodiments, as shown in view 400C of in FIG. 4C, the motor 408, gear box 406, and throttle plate 404 may be placed in the throttle body 402 such that the plate 404 blocks a portion (e.g., an aperture) of the throttle body 402 through which landfill gas flows. The position of the plate 404 determines the size of the blocked portion of the throttle body 402. In some embodiments, the plate 404 may have a maximum closed position at which a maximum portion of an aperture of the throttle body 402 through which the landfill gas flows is blocked. In some embodiments, in the maximum closed position, the throttle plate 404 may maintain a space 412 in the aperture to allow at least some flow of landfill gas via the throttle body 402. This may prevent a complete blockage of flow, and further prevent a gas collection point from being at a positive pressure relative to the landfill.

FIG. 4C illustrates that throttle plate 404 moves with relatively low friction. Plate 404, for example, may be attached in a cantilevered fashion to a shaft coupled to motor 408. As a result of space 412, plate 404 may be mounted and rotated while making little or no contact with the walls of the throttle body 402. Further the plate 404 may be thin and therefore light.

In some embodiments, the throttle may require little motive force to set its position. As the throttle need not fully seal the aperture in the well piping, it is not necessary for the plate or other moving portions of the throttle to contact the walls of the aperture. Adjusting the position of the throttle may entail overcoming a small amount of friction. Accordingly, the throttle may include a motor 206A that is less than or equal to 1 inch cubed (16 cm$^3$). In some embodiments, the throttle may include a motor that is less than 2 inches cubed (32 cm$^3$), 3 inches cubed (49 cm$^3$), or 4 inches cubed (66 cm$^3$). In some embodiments the throttle may include a motor that is less than or equal to any size between 1-5 inches cubed (16-82 cm$^3$).

In some embodiments, the motor may weigh less than or equal 1 lbs. (0.45 kg). In some embodiments, the motor may weigh less than or equal to 0.5 lbs.(0.23 kg). In some embodiments, the motor may weigh less than or equal to 0.25 lbs.(0.11 kg). In some embodiments, the motor may weigh less than or equal to 2 lbs. (0.9 kg). In some embodiments, the motor may weigh less than or equal to 3 lbs. (1.36 kg). In some embodiments, the motor may weigh between 0.1 lbs. (0.045 kg) and 1 lbs. (0.45 kg). In some embodiments, the motor may weigh between 0.1 lb. (0.045 kg) and 5 lbs.(2.27 kg). In some embodiments, the motor may weight approximately 1 lbs. (0.45 kg). In some embodiments, the motor may weigh approximately 2 lbs. (0.9 kg). In some embodiments, the motor may weigh 3 lbs. (1.36 kg).

In some embodiments, the motor may be configured to use less than 10 watts of power. In some embodiments, the motor may be configured to use less than 15, 20, 25, 30, 35 or 40 watts of power. In some embodiments, the motor may be configured to use any power between 10 watts and 50 watts. and/or a particular power usage of the motor. Some embodiments are not limited to a particular motor power usage or range of motor power usages. In some embodiments, the entire throttle may be compact and light, such as less than one pound (0.45 kg) and, in some embodiments less than 6 ounces (0.17 kg).

Figure 5:
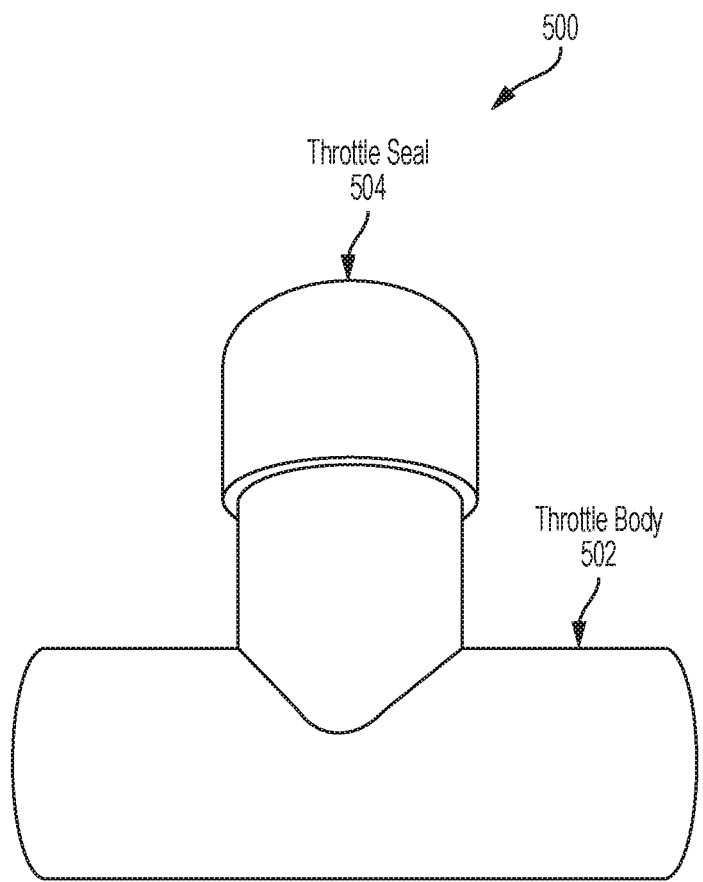
FIG. 5 illustrates a sealed throttle, in accordance with some embodiments of the technology described herein.

FIG. 5 illustrates a throttle 500 with one or more components of the throttle sealed in a throttle body 502. In some embodiments, the throttle 500 may include a seal 504 which encloses the controller circuit (e.g., controller circuit 410) and motor (e.g., motor 408). In some embodiments, the seal 504 may prevent gases and/or liquids from entering the throttle body 502 from a source other than the landfill. In some embodiments, the seal 504 may prevent gas (e.g., landfill gas) from exiting the throttle body 502 from a location other than an exit port of the throttle body 502.

Figure 6:
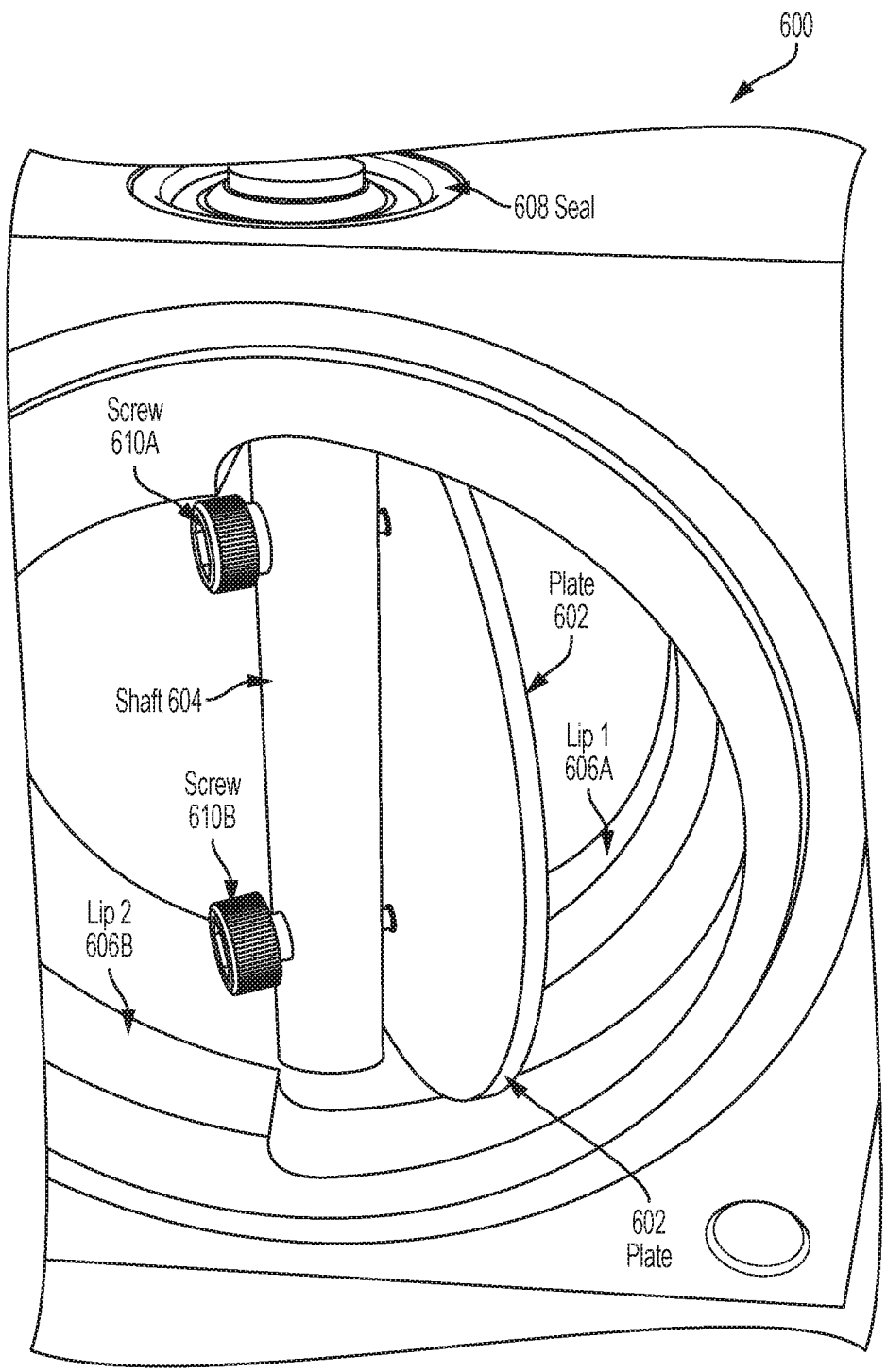
FIG. 6 illustrates components of a throttle, in accordance with some embodiments of the technology described herein.

FIG. 6 illustrates components of a throttle 600 according to some embodiments. The throttle 600 may include a plate 206 attached to a shaft 604. The plate 602 is attached to the shaft 604 by screws 610A-B that join the shaft 604 to the plate 602. As a result, rotation of the shaft 604 results in rotation of the plate 602. The throttle 600 also includes lips 606A-B that restrict rotation of the plate 602 at a position of maximum closure of the plate 602 as described above with reference to FIGS. 2I-J. The lips 606A-B may prevent the plate 602 from rotating beyond a certain point. For example, the lips 606A-B may prevent the plate 602 from rotating more than 90 degrees from a position in which the plate 602 is in a position of minimum closure. In some embodiments, the plate 602 is at the position of minimum closure when the plate 602 is blocking a minimum amount of an aperture through which landfill gas can flow. In some embodiments, the plate 602 has a size that is greater than the aperture through which the landfill gas flows.

The throttle 600 includes a seal 608 that is configured to seal the shaft 604. The seal 608 prevents landfill gas from escaping from the throttle. The seal 608 ensures that landfill gas flows only through an aperture that is controlled by the throttle 600 based on a rotational position of the plate 602. In some embodiments, the seal 608 comprises a radial shaft seal that prevents landfill gas from escape through the opening that the shaft enters a passageway of the landfill gas extraction system for attachment to a movable member.

Figure 7:
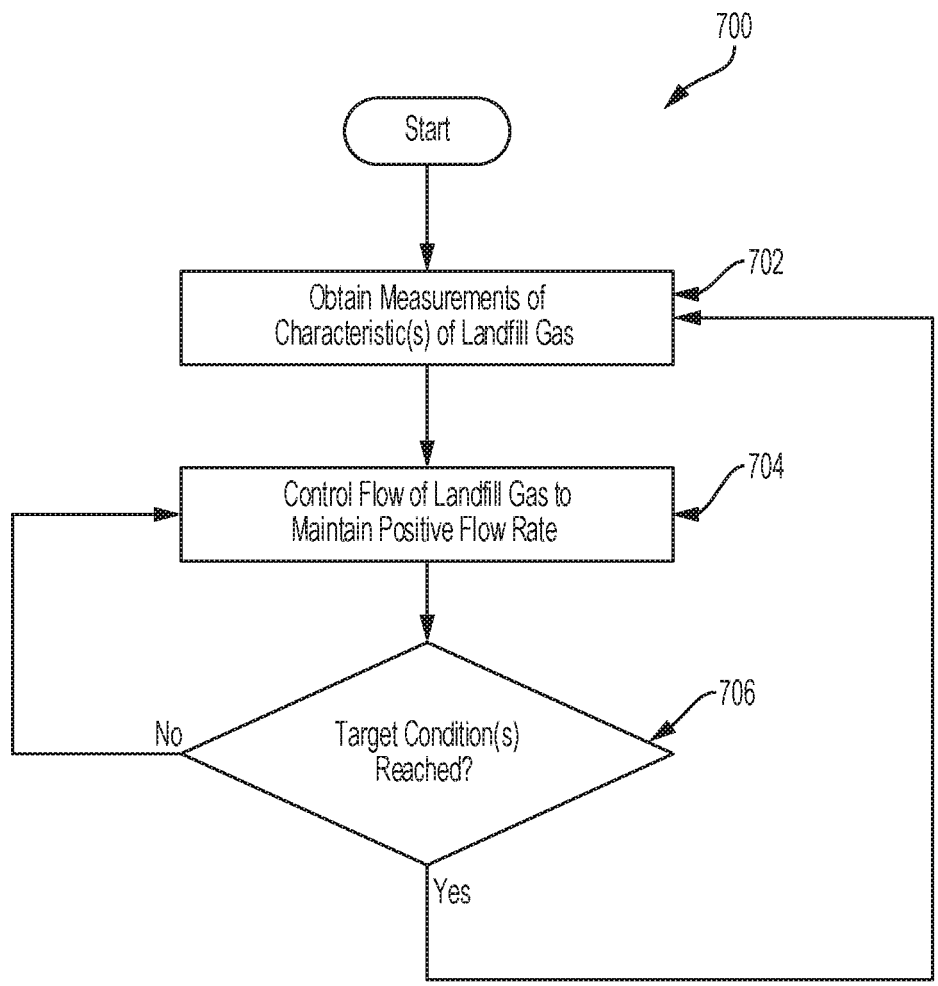
FIG. 7 is a flowchart of an illustrative process for controlling extraction of landfill gas, in accordance with some embodiments of the technology described herein.

FIG. 7 illustrates a flow chart of an example process 700 for controlling extraction of landfill gas from a landfill through a gas extraction system, according to some embodiments. Process 700 may be performed, for example, by control system 112 described above with reference to FIG. 1.

Process 700 begins at act 702 where the control system 112 obtains measurements of one or more landfill gas characteristics. The control system 112 may include one or more sensors with the control system 112 may be configured to use to obtain the measurements. In some embodiments, the control system 112 may include a gas analyzer (e.g., gas analyzer 202 described above with reference to FIG. 2) which the control system 112 uses to obtain the measurements of the characteristic(s). For example, the control system 112 may be configured (1) to collect a sample of gas in a gas chamber of the gas analyzer, and (2) obtain the measurements of the characteristic(s) using one or more sensors in the gas chamber. In some embodiments, the control system 112 may include one or more external sensors (e.g., external sensors 203 described above with reference to FIG. 2) to collect other information. The control system 112 may be configured to obtain measurements using the external sensor(s) about the environment outside of the landfill (e.g., ambient temperature, air pressure). Some embodiments are not limited to a specific set of sensors or locations of sensors to obtain the measurements.

Next, process 700 proceeds to act 704 where the control system 112 controls the flow of landfill gas extracted from the landfill through the gas extraction system. In some embodiments, the control system 112 may be configured to control the flow of landfill gas by modulating the flow without stopping the flow such that the flow rate is positive during operation of the gas extraction system. In some embodiments, the control system 112 may be configured to modulate flow using a throttle (e.g., throttle 310 described above with reference to FIGS. 3A-C). The throttle maintains a positive flow rate of landfill gas. For example, the throttle maintains at least some flow between the landfill 102 and the gas collection system 114.

In some embodiments, the control system 112 may be configured to control the flow of landfill gas by controlling a position of the throttle. The throttle may be configured to block a variable portion of an aperture through which the landfill gas flows. The control system 112 may be configured to control the position of the throttle to control the portion of the aperture that is blocked. In some embodiments, the control system 112 may be configured to control the position of the throttle by controlling a rotational position of a plate. The rotational position of the plate may determine a size (e.g., an area) of the blocked portion of the aperture. In some embodiments, at a position of maximum closure, the plate may still leave an amount of the aperture unblocked to maintain a positive flow of landfill gas from the landfill 102 to the gas collection system 114.

In some embodiments, the control system 112 may be configured to control the throttle position using a motor (e.g., motor 316). The control system 112 may be configured to control the position of the throttle by adjusting the position of the plate to control the portion of the aperture that is blocked. In some embodiments, the control system 112 may use less than 20 watts of power to use the motor to adjust the position of the plate. In some embodiments, the control system 114 may be configured to draw power only when the plate position needs to be changed. For example, the throttle may comprise a gear box (e.g., gear box 318) that holds the plate at a position after actuation by the motor. The gear box may be configured to prevent back-drive of the plate.

In some embodiments, the control system 112 may be configured to control the throttle position based on measurements obtained by one or more sensors. The control system 112 can be configured to adjust the throttle position based on a measured flow rate across the throttle, pressure upstream of the throttle, pressure downstream of the throttle, a difference between pressure upstream and downstream of the throttle. The control system 112 may be configured to set the throttle position according to the measurement(s) to set the flow rate of landfill gas flowing across the throttle.

After controlling the flow of landfill gas at act 704, process 700 proceeds to act 706 where the control system 112 determines whether one or more target conditions have been reached. In some embodiments, the control system 112 may be configured to control flow of landfill gas based on target conditions. The target condition(s) can comprise a target flow rate, a target energy content of the landfill gas extracted from the landfill, a target concentration of one or more gases in the landfill, a target temperature of the landfill gas, a target pressure differential between upstream and downstream of the throttle, a target pressure upstream or downstream of the throttle, and/or another target condition. The control system 112 may use the obtained measurements of the characteristic(s) of the landfill as indications of a current condition of landfill gas extracted from the landfill.

For example, the control system 112 may be configured to calculate a current energy content of the landfill gas using a measured flow rate of the landfill gas and/or a measured concentration of methane in the landfill gas. The control system 112 may then determine whether the current energy content meets a target energy content. In another example, the control system 112 may be configured to determine a current composition of the landfill gas using the measurements. The control system 112 may then determine whether the current composition of landfill gas meets a target composition.

If a target condition has not been reached, process 700 returns to act 704 where the control system 112 further modulates the flow. For example, the control system 112 may be configured to adjust the throttle position (e.g., the rotational position of the plate) to change the flow (e.g., flow rate) to reach the target condition. The control system 112 may use the motor to further adjust the rotational position of the plate to modify the flow rate to modify the condition(s) of the landfill gas. In some embodiments, the control system 112 can be configured to return to act 704 after a set period of time. For example, the control system 112 can be configured to return to act 704 after determining the target condition(s) have not been met for one second, one hour, one day, one week, or another period of time.

If the target condition(s) are reached at act 706, the process 700 returns to act 702 where the control system 112 obtains measurements of the characteristic(s). In some embodiments, the control system 112 can be configured to return to act 702 after a set period of time. For example, the control system 112 can be configured to return to act 702 after reaching a target condition after one second, one hour, one day, one week, or another period of time.

In some embodiments, the control system 112 may be configured to perform process 700 at a regular frequency. For example, the control system 112 may be configured to perform process 700 every second, hour, day, week, month, year, or other time period. In some embodiments, the control system 112 may be configured to perform process 700 in response to detecting a particular condition. For example, the control system 112 may be configured to perform process 700 at a particular time of day, in response to detecting a particular landfill gas condition (e.g., temperature, composition), and/or in response to detecting a condition of the environment (e.g., ambient temperature, air pressure). In some embodiments, the control system 112 may be configured to perform process 700 in response to a user command. Some embodiments are not limited to when the control system 112 performs process 700.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Further, it should be appreciated that various modifications may be made to the specific construction described herein. For example, embodiments are described herein in which a throttle is mechanically configured so as not to fully block a flow path between the well head and gas collection system, even in a position of maximum closure of the throttle. Accordingly, regardless of the output of any control algorithm, so long as the vacuum system is operating as part of the gas collection system, a negative pressure will be maintained at the well head.

It should be appreciated that the same effect may be achieved, for example, by limiting the control signals sent to a control valve. The control signals may be limited so as to preclude control signals that fully close the valve during operation of the gas extraction system.

Further, while a throttle is described as allowing some gas to flow, even in a fully closed position, it may be appreciated that, in some scenarios, it may be desired to fully close off the flow of gas. For example, it may be desired to shut off the gas extraction system for maintenance. To accommodate for such scenarios, one or more valves may be connected to the well piping that may shut off the flow of gas even if the throttle is not fully blocking an aperture through which gas would otherwise flow. In scenarios in which a throttle is implemented by a valve that is controlled so as not to fully close during operation of the gas extraction system, full closure may be achieved, for example, by removing constraints on position of the valve to fully shut of gas flow.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately" and "about" may include the target value.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A control system for controlling extraction of landfill gas from a landfill via a gas extraction system, the gas extraction system comprising well piping for coupling at least one well to a gas output, the control system comprising:
   a throttle disposed in the well piping and comprising a movable member configured to restrict flow of landfill gas through an area of the well piping, wherein the movable member has a position of maximum closure at which the movable member provides a maximum amount of restriction to the flow of landfill gas permitted by the control system and which blocks less than a full area of an aperture of the well piping through which landfill gas flows so that at least some landfill gas can flow past the throttle with the movable member at the position of maximum closure within the throttle; and
   a controller configured to control a position of the movable member to control the flow of landfill gas through the area of the well piping,
   wherein the controller is programmed to prevent the throttle from blocking all flow of landfill gas through the area of well piping by limiting control signals sent to the throttle controlling motion of the movable member thereby precluding motion of the movable member beyond the position of maximum closure.

2. The control system of claim 1, wherein the movable member comprises a plate configured to restrict the flow of landfill gas.

3. The control system of claim 2, wherein controlling the position of the movable member comprises rotating the plate.

4. The control system of claim 2, wherein controlling the position of the movable member comprises sliding the plate along a plane intersecting the flow of landfill gas.

5. The control system of claim 1, wherein the movable member comprises a ball configured to restrict the flow of landfill gas.

6. The control system of claim 1, wherein the throttle is configured to maintain a difference in pressure between upstream and downstream of the throttle greater than 0 mbar.

7. The control system of claim 1, wherein the flow of landfill gas past the throttle when the movable member is at the position of maximum closure is at least 0.1 cubic feet per minute.

8. The control system of claim 1, wherein the throttle comprises a motor configured to adjust a variable portion of the aperture through which the landfill gas flows.

9. The control system of claim 1, wherein the throttle is configured to provide control of the flow of landfill gas on a continuous scale.

10. The control system of claim 1, further comprising a flow measurement device configured to obtain a measurement of flow rate of landfill gas past the throttle, wherein the controller is configured to control the position of the movable member based at least on the obtained measurement of flow rate.

11. The control system of claim 1, further comprising:
   a pressure sensor configured to obtain a measurement of pressure upstream of the throttle;
   wherein the controller is configured to control the position of the movable member based at least on the obtained measurement of the pressure upstream of the throttle.

* * * * *